United States Patent
Scott

(10) Patent No.: US 10,320,712 B2
(45) Date of Patent: Jun. 11, 2019

(54) SYSTEM AND METHOD FOR CONFIGURING A SWITCH MATRIX ON-BOARD A VEHICLE BASED ON NETWORK INFORMATION

(71) Applicant: THE BOEING COMPANY, Chicago, IL (US)

(72) Inventor: James Patrick Scott, Manhattan Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/680,141

(22) Filed: Aug. 17, 2017

(65) Prior Publication Data

US 2019/0058672 A1 Feb. 21, 2019

(51) Int. Cl.
| | |
|---|---|
| H04L 12/947 | (2013.01) |
| H04W 16/28 | (2009.01) |
| H04L 12/723 | (2013.01) |
| H04W 84/06 | (2009.01) |

(52) U.S. Cl.
CPC .............. *H04L 49/25* (2013.01); *H04L 45/50* (2013.01); *H04W 16/28* (2013.01); *H04W 84/06* (2013.01)

(58) Field of Classification Search
CPC ........................... H04B 7/18526; H04B 17/40; H04B 7/18584; H04B 7/18515; H04B 7/18582; H04L 49/25; H04L 45/50; H04W 84/06; H04W 16/28
See application file for complete search history.

(56) References Cited

U.S. PATENT DOCUMENTS

| | | | |
|---|---|---|---|
| 5,796,715 A | 8/1998 | Patterson et al. | |
| 6,515,579 B1* | 2/2003 | Murdock | H04B 7/18515 340/14.1 |
| 7,349,635 B2 | 3/2008 | Chuah et al. | |
| 7,542,716 B2 | 6/2009 | Bell et al. | |
| 7,720,099 B2 | 5/2010 | Bueno et al. | |
| 2001/0026537 A1 | 10/2001 | Massey | |
| 2004/0132448 A1* | 7/2004 | Torres | H04B 7/18595 455/427 |

(Continued)

FOREIGN PATENT DOCUMENTS

WO 2017023621 A1 2/2017

OTHER PUBLICATIONS

"OpenFlow Switch Specification", Open Networking Foundation, Version 1.4.0, Oct. 14, 2013, 205 pages.

(Continued)

*Primary Examiner* — Dady Chery
(74) *Attorney, Agent, or Firm* — Toler Law Group, PC

(57) ABSTRACT

A method includes receiving a request associated with a communications path from a first device to a second device. The method includes generating switching configuration data based on network topology data associated with the communications path. The switching configuration data indicates a configuration of a switch matrix of a satellite. The method further includes causing the switch matrix to initialize or modify the communications path based on the switching configuration data. A portion of the communications path includes components of a payload of the satellite. The components including the switch matrix.

20 Claims, 5 Drawing Sheets

(56) References Cited

U.S. PATENT DOCUMENTS

| | | | |
|---|---|---|---|
| 2004/0185775 A1* | 9/2004 | Bell | H04B 7/18515 455/12.1 |
| 2010/0265879 A1 | 10/2010 | Foxworthy et al. | |
| 2014/0036765 A1* | 2/2014 | Fujimura | H04B 7/18515 370/317 |
| 2017/0230105 A1 | 8/2017 | Baudoin et al. | |

OTHER PUBLICATIONS

Awduche, et al., "RSVP-TE: Extensions to RSVP for LSP Tunnels", RFC 3209, Dec. 2001, 62 pages.

Berger, "Generalized Multi-Protocol Label Switching (GMPLS) Signaling Functional Description", RFC 3471, Jan. 2003, 35 pages.

Berger, "Generalized Multi-Protocol Label Switching (GMPLS) Signaling Resource Reservation Protocol—Traffic Engineering (RSVP-TE) Extensions", RFC 3473, Jan. 2003, 43 pages.

Farrel, "A Path Computation Element (PCE)—Based Architecture", RFC 4655, Aug. 2006, 35 pages.

Farrel, et al., "Inter-Domain MPLS and GMPLS Traffic Engineering—Resource Reservation Protocol-Traffic Engineering (RSVP-TE) Extensions", RFC 5151, Feb. 2008, 26 pages.

Katz, et al., "Traffic Engineering (TE) Extensions to OSPF Version 2", RFC 3630, Sep. 2003, 15 pages.

Kompella, et al., "Label Switched Paths (LSP) Hierarchy with Generalized Multi-Protocol Label Switching (GMPLS) Traffic Engineering (TE)", RFC 4206, Oct. 2005, 15 pages.

Kompella, et al., "Link Bundling in MPLS Traffic Engineering (TE)", RFC 4201, Oct. 2005, 13 pages.

Kompella, et al., "OSPF Extensions in Support of Generalized Multi-Protocol Label Switching (GMPLS)", RFC 4203, Oct. 2005, 12 pages.

Kompella, et al., "Routing Extensions in Support of Generalized Multi-Protocol Label Switching (GMPLS)", RFC 4202, Oct. 2005, 28 pages.

Kompella, et al., "Signalling Unnumbered Links in Resource Reservation Protocol—Traffic Engineering (RSVP-TE)", RFC 3477, Jan. 2003, 10 pages.

Mannie, "Generalized Multi-Protocol Label Switching (GMPLS) Architecture", RFC 3945, Oct. 2004, 70 pages.

Rosen, et al., "BGP/MPLS IP Virtual Private Networks (VPNs)", RFC 4364, Feb. 2006, 48 pages.

Shiomoto, et al., "Procedures for Dynamically Signaled Hierarchical Label Switched Paths", RFC 6107, Feb. 2011, 30 pages.

Shiomoto, et al., "Requirements for GMPLS-Based Multi-Region and Multi-Layer Networks (MRN/MLN)", RFC 5212, Jul. 2008, 29 pages.

European Search Report dated Dec. 18, 2019 in corresponding EP Application No. 18186723.5-1219, 13 pgs.

Le-Ngoc, "Switching for IP-Based Multimedia Satellite Communications" IEEE Journal on Selected Areas in Communications, vol. 22, No. 3, Apr. 2004, pp. 462-471.

* cited by examiner

SYSTEM AND METHOD FOR CONFIGURING A SWITCH MATRIX ON-BOARD A VEHICLE BASED ON NETWORK INFORMATION

FIELD OF THE DISCLOSURE

The present disclosure is generally related to satellite-based networks (or other vehicle-based networks), and more particularly, to configuring a switch matrix on-board a satellite.

BACKGROUND

Satellite-based networks are capable of transporting internet protocol (IP) traffic between subscriber devices, between external networks, or between a subscriber device and an external network. For example, a satellite may receive a first radio frequency (RF) signal including IP traffic at a receive antenna, perform "beam-to-beam" switching (e.g., route at least a portion of the RF signal from an input port coupled to the receive antenna to an output port coupled to a transmit antenna via a switch matrix), and transmit a second RF signal including the IP traffic from the transmit antenna. The satellite acts as a switched network in that a communications path from an input port to an output port can be established and used to propagate communications data. When the communications path is no longer requested, the switch matrix can be adjusted to terminate the current communications path (and establish another communications path). In this manner, the satellite enables the flow of IP traffic from a first device of a satellite-based network (or an external network) to a second device of the satellite-based network (or an external network). Configuration of the switch matrix is controlled by a ground-based operations center.

Typically, satellites are configured to receive RF signals in designated frequency bands (e.g., uplink bands or uplink channels), perform frequency translation on the received signals (e.g., from an uplink carrier to a downlink carrier), and transmit the frequency-translated signals at designated frequency bands (e.g., downlink bands or downlink channels) to terrestrial receivers or to other satellites. The signals are frequency translated without being demodulated.

SUMMARY

In a particular implementation, a method includes receiving a request associated with a communications path from a first device to a second device. The method includes generating switching configuration data based on network topology data associated with the communications path. The switching configuration data indicates a configuration of a switch matrix of a satellite. The method further includes causing the switch matrix to initialize or modify the communications path based on the switching configuration data. A portion of the communications path includes components of a payload of the satellite. The components include the switch matrix. In a particular implementation, the request is received and the switching configuration data is generated at the satellite (e.g., on-board the satellite). In an alternate implementation, the request is received and the switching configuration data is generated at a ground-based operations center or a gateway.

In another particular implementation, a non-transitory, computer readable medium stores instructions that, when executed by a processor, cause the processor to perform operations including processing, at a satellite, a request associated with a communications path from a first device to a second device. A portion of the communications path includes components of a payload of the satellite, the components including a switch matrix. The operations include generating, either at the satellite, switching configuration data based on network topology data associated with the communications path. The switching configuration data indicates a configuration of a switch matrix of the payload. The operations further include configuring the switch matrix to initialize or modify the communications path based on the switching configuration data. In other implementations, the non-transitory, computer readable medium stores instructions that are executed by a processor of a ground-based operations center or a gateway.

In another particular implementation, a system includes a vehicle including a switch matrix that includes a plurality of switches coupled between one or more receive antennas of the vehicle and one or more transmit antennas of the vehicle. The vehicle also includes circuitry configured to initialize or modify a configuration of the switch matrix based on switching configuration data. The system further includes a ground-based device of a communications network. The ground-based device is configured to generate the switching configuration data based on either network topology data associated with a communications path from a first device to a second device. A portion of the communications path includes components of a payload of the vehicle, the components including the switch matrix. In a particular implementation, the switching configuration data is generated further based on user plane traffic patterns.

DETAILED DESCRIPTION

Figure 1:
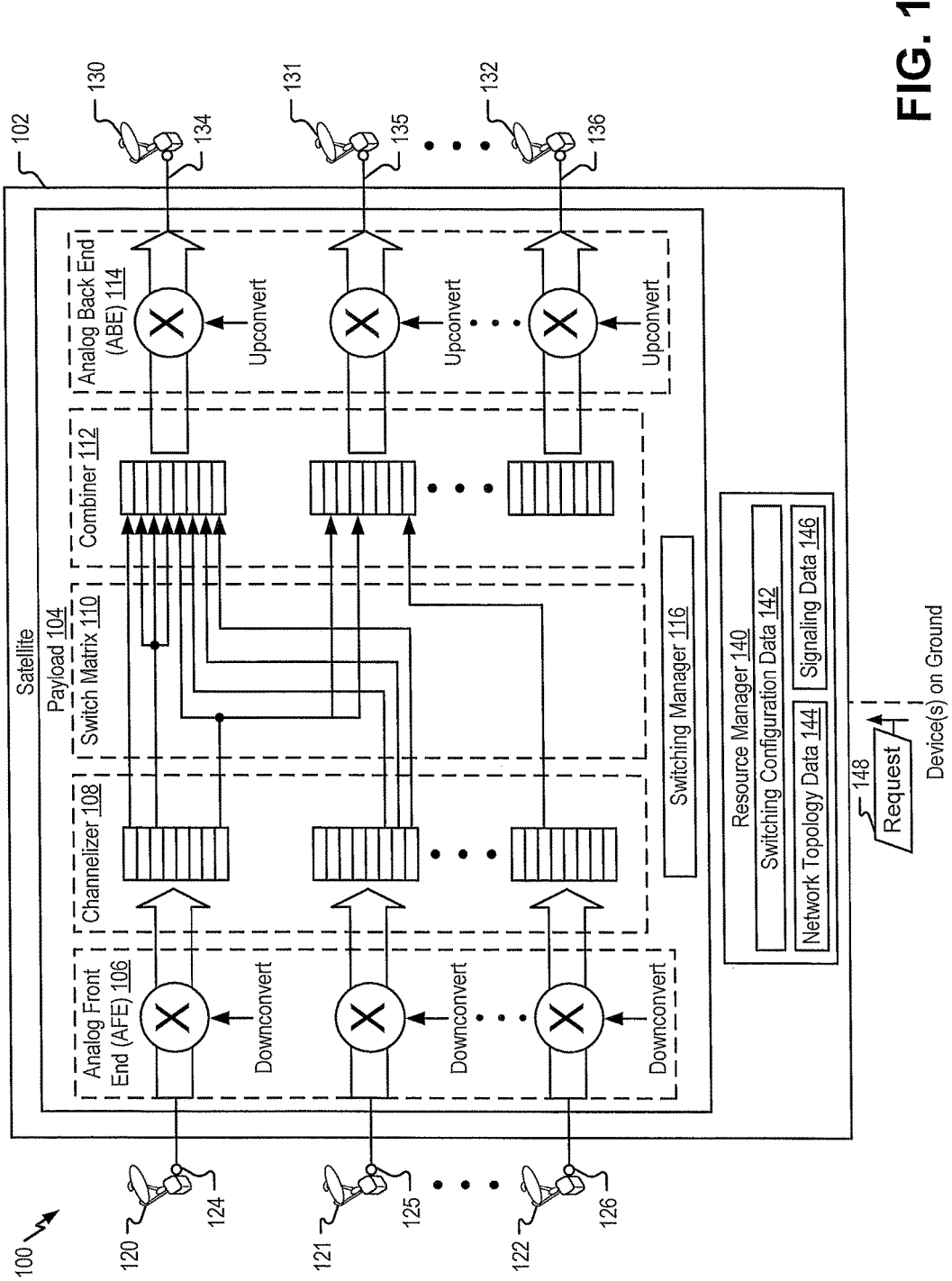
FIG. 1 is a block diagram that illustrates a particular implementation of a system for configuring a switch matrix of a satellite based on network control plane information or user plane traffic patterns.

Particular implementations are described with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

In the present disclosure, terms such as "determining", "calculating", "generating", "adjusting", "modifying", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device. Additionally, "adjusting" and "modifying" may be used interchangeably. For example, "adjusting" or "modifying" a parameter may refer to changing the parameter from a first value to a second value (a "modified value" or an "adjusted value"). As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc. As used herein, "directly coupled" may include two devices that are coupled (e.g., communicatively coupled, electrically coupled, or physically coupled) without intervening components.

Implementations disclosed herein are directed to systems, computer-readable mediums, and methods of operating a vehicle-based communications network that performs communications data routing on-board the vehicle based on network information to provide flexible peering with "adjacent" network devices. To illustrate, a satellite-based network (e.g., a vehicle-based network) includes a satellite that is configured to transport internet protocol (IP) traffic from a first device (e.g., a device of a first network on the ground, such as a customer edge router) to a second device (e.g., a device of a second network on the ground, such as a customer edge router). As described further herein, a satellite (or other vehicle) of the present disclosure is configured to perform on-board signal routing (due to configuration of a switch matrix of the satellite) based on network control plane information, such as network routing topology data and signaling control data associated with one or more networks in a communications path between the first device and the second device. The network routing topology data and the signaling control data may be communicated and formatted in accordance with one or more label-switched or packet-switched routing protocols, and the satellite is configured to generate switching configuration data based on the network routing topology data and the signaling control data without demodulating communications data received on-board the satellite to extract labels or other headers for use in routing the communications data.

To further illustrate, the satellite includes a switch matrix that is configured to "switch" signals received at input ports (e.g., from input or uplink beams) of the satellite to output ports (e.g., to output or downlink beams) of the satellite for transmission to one or more ground-based (e.g., terrestrial) devices. As used herein, "switching" signals refers to routing signals (or portions thereof) through one or more switches of the switch matrix, assigning signals (or portions thereof) to one or more timeslots (or frequencies in an optical implementation), or other operations that cause the signals (or portions thereof) to traverse one or more communications paths from the input ports to the output ports via the switch matrix (and any other components of the satellite payload therebetween). The switch matrix may include one or more physical switches, one or more optical switches, or one or more digital components (e.g., filters, etc.) configured to switch received signals (or portions thereof) from an input port of the satellite to an output port of the satellite. A resource manager (e.g., a processor, a controller, an application-specific integrated circuit (ASIC), a field-programmable gate array (FPGA), or other circuitry) associated with the satellite is configured to generate switching configuration data that is provided to the satellite in order to configure the switch matrix. In a particular implementation, the resource manager is integrated in a ground-based operations center of the satellite-based network (e.g., a terrestrial network operations center) or in a ground-based gateway of the satellite-based network. In an alternate implementation, the resource manager is integrated on-board the satellite. The resource manager is further configured to receive network control plane information, such as network routing topology data and signaling control data, and to generate the switching configuration data based on the network information. In an alternate implementation, the resource manager is configured to monitor user network traffic patterns to generate the switching configuration data. The network control plane information is received independently of user plane traffic data (e.g., user network traffic) to be routed on-board the satellite and transmitted to one or more components on the ground or to other satellites.

To illustrate, the satellite-based network may transport IP traffic between a first external network (e.g., a first ground-based network) and a second external network (e.g., a second ground-based network). The first external network and the second external network include label-switched networks (or other IP-switched networks). Network nodes (e.g., routers) of the first external network and the second external network share network routing topology data and signaling control data in order to perform label-switching (e.g., label-based routing) at the network nodes. The resource manager is configured to receive the network routing topology data and the signaling control data from the network nodes of the first external network and the second external network and to generate the switching configuration data based on the network routing topology data and the signaling control data (to initialize or modify a communications path between a device of the first external network and a device of the second external network). The resource manager is further configured to provide network routing topology data and signaling control data generated at the resource manager to network nodes of the first external network and the second external network. The network routing topology data and the signaling control data may be generated and shared in accordance with one or more specifications or protocols, such as a generalized multiprotocol label switching (GMPLS) protocol suite or an OPENFLOW™ protocol suite (OPENFLOW is a licensed trademark of the Open Networking Foundation of Menlo Park, Calif.).

Because the switch matrix is configured based on either the network control plane information (e.g., the network routing topology data and the signaling control data) or based on user plane traffic patterns, the satellite-based network is able to perform the functionality of a label-switched router even though the communications data routed onboard the satellite through the switch matrix is not demodulated to extract labels or headers for use in routing the communications data (e.g., in modifying the configuration of the switch matrix). In some implementations, satellites (or other vehicles) perform on-board resource management functionality that translates the network control plane information into switching configuration data. In other implementations, legacy satellites (e.g., satellites that are not configured to perform on-board resource management functionality) are controlled by a resource manager integrated within a ground-based operations center or within one or more gateways to enable the legacy satellites to appear to peering devices on the ground as a label-switched router, as further described herein. Satellite-based networks of the present disclosure are thus able to perform label-switching functionality, as compared to other satellite-based networks that do not perform on-board demodulation to extract labels that encapsulate the IP packets (or headers of the IP packets) for use in routing communications data on-board satellites. These other satellite-based networks are thus unable to interact with other networks according to a "full-peering model" (e.g., a model in which all network nodes in all networks in an end-to-end network path are capable of dynamically sharing routing and signaling information to enable selection of network paths that satisfy quality of service (QoS) or other provider-specific criteria), a "partial peering model" (e.g., a model in which the satellite-based network appears to perform label-based routing without sharing routing and signaling information with external networks), or the traditional "overlay model" (e.g. the satellite network is managed as a separate and unique network from other external peering networks). Because these other satellite-based networks are not able to interact with other networks according to these peering models (e.g., at least the full peering model and the partial peering model), these other satellite based networks present challenges in designing end-to-end communications paths across multiple networks (including satellite-based networks) and are unable to meet various end-to-end traffic criteria, such as QoS criteria.

In contrast, satellite-based networks (or other vehicle-based networks) of the present disclosure are able to perform label-switching (or other IP-switching) functionality and are able to share network information with other networks, allowing for network services to be created and deployed with more agility (e.g. edge-to-edge paths can be established without operator intervention). Because the resource manager is configured to receive network information from other networks to use in configuring the switch matrix and is configured to share switching information related to communications paths through the switch matrix with the other networks, the satellite-based network is able to interact with the other networks according to a "partial-peering" model (e.g., the satellite-based network is able to route communications data but does not share information of the internal switching configuration) or a "full-peering" model (e.g., the satellite based network is able to route communications data and shares information of the internal switching configuration with network nodes of the other networks). As used herein, peering refers to "logical adjacency" between networks. Interacting with other networks according to the partial-peering model or the full-peering model may enable the satellite-based network to meet traffic engineering criteria, such as quality of service (QoS) criteria or network-specific rules or criteria that are not met by satellite-based networks that operate with other networks according to an overlay model (e.g., a separate network that connects two other networks without operating in accordance with the same networking protocols and without sharing information regarding internal network operations or communications paths).

FIG. 1 illustrates an example of a particular implementation of a system 100 for configuring a switch matrix of a satellite based on network information. As further described herein, configuration of a switch matrix 110 is based on network information, thereby enabling on-board routing of communications data (included in signals received at a satellite) based on the network information. On-board routing of signals (and the communications data contained therein) based on network information enables the system 100 to interact with other communications networks according to a full-peering model (or partial peering model), thereby enabling the system 100 to support various end-to-end communications criteria, such as quality of service (QoS) criteria or provider-specific criteria, as further described herein.

The system 100 includes a satellite 102. The satellite 102 is part of a satellite-based communications network. Although described herein as a satellite, in other implementations, the system 100 includes a different vehicle. As used herein, a vehicle refers to a spacecraft or an aircraft and is distinct from ground-based (e.g., terrestrial) devices. To illustrate, a vehicle includes spacecraft, such as a satellite, a shuttle, etc., or an aircraft. In a particular implementation, the system 100 includes an unmanned aerial vehicle (UAV) (e.g., a drone aircraft).

The satellite 102 includes a payload 104 and one or more control systems (which are not illustrated for convenience). The one or more control systems include one or more processors, one or more controllers, dedicated hardware, or a combination thereof, that are configured to perform control operations for the satellite 102, such as power generation and control, thermal control, telemetry, altitude control, orbit control, or other control operations, as non-limiting examples.

The payload 104 is configured to provide communications services to users of a satellite-based network that includes the satellite 102. The communications services include data communications (e.g., interact protocol (IP) packet communications), telephone communications, Internet access, radio, television, other types of communications, or a combination thereof, as non-limiting examples. The payload 104 includes receive antennas (or receive antenna arrays), transmit antennas (or transmit antenna arrays), and circuitry therebetween (e.g., processing and routing circuitry between input ports and output ports of the satellite 102). To illustrate, the payload 104 includes a first receive antenna 120 coupled to a first input port 124, a second receive antenna 121 coupled to a second input port 125, a Nth receive antenna 122 coupled to a Nth input port 126, a first transmit antenna 130 coupled to a first output port 134, a second transmit antenna 131 coupled to a second output port 135, and a Mth transmit antenna 132 coupled to a Mth output port 136. In some implementations, the receive antennas 120-122 are included in one or more receive antenna arrays, and the transmit antennas 130-132 are included in one or more transmit antenna arrays. In some implementations, one or more of the receive antennas 120-122 are included in the same receive antenna array, one or more of the transmit antennas 130-132 are included in the same transmit antenna array, or both.

In the particular implementation illustrated in FIG. 1, the payload 104 includes three receive antennas and three transmit antennas (e.g., N and M are equal to 3). In other implementations, the payload 104 includes more than three or fewer than three receive antennas, and the payload 104 includes more than three or fewer than three transmit antennas. In some implementations, the number of receive antennas and the number of transmit antennas are the same (e.g., N is equal to M). In other implementation, the payload 104 includes more receive antennas than transmit antennas or fewer receive antennas than transmit antennas (e.g., N is not equal to M).

In addition to the receive antennas 120-122 and the transmit antennas 130-132, the payload 104 includes an analog front end (AFE) 106, the switch matrix 110, and an analog back end (ABE) 114. The AFE 106 includes circuitry, such as low noise amplifiers (LNAs), filters, mixers, analog-to-digital converters (ADCs), etc., configured to perform analog processing on RF signals received at the input ports 124-126 from the receive antennas 120-122 and to convert the RF signals to the digital domain. In a particular implementation, the AFE 106 includes N mixers configured to downconvert N RF signals to intermediate frequency (IF) signals for digital processing. The ABE 114 includes circuitry, such as power amplifiers (PAs) or driver amplifiers, filters, mixers, digital-to-analog converters (DACs), etc., configured to perform digital-to-analog conversion (e.g., to convert the IF signals to RF signals) and to perform analog processing on the RF signals prior to output from the output ports 134-136 to the transmit antennas 130-132.

The switch matrix 110 includes circuitry configured to route one or more outputs (or portions thereof) from the AFE 106 to the ABE 114 in order to route one or more signals (or portions thereof) from the input ports 124-126 to the output ports 134-136. To illustrate, the switch matrix 110 includes one or more switches (e.g., integrated circuits (ICs) that perform switching functionality), one or more optical switches, one or more microwave switches, other digital circuitry configured to perform routing and switching functionality (e.g., filters, application-specific integrated circuits (ASICs), field-programmable gate arrays (FPGAs), etc.), or a combination thereof. As an example, the switch matrix 110 includes a plurality of switches configured to couple one or more of the input ports 124-126 to one or more of the output ports 134-136. In a particular implementation, the switch matrix 110 includes a plurality of switch ASICs associated with a respective plurality of sub-bands and interconnected via a shared bus or other communications medium.

In some implementations, the payload 104 further includes a channelizer 108 and a combiner 112. The channelizer 108 includes digital circuitry configured to receive a digital representation of a sub-band spectrum received on an uplink beam at a receive antenna and to divide the sub-band spectrum into any number of equally or unequally sized frequency "slices". To illustrate, some satellites includes "transponders" (e.g., a RF receiver, frequency translating circuitry, and a RF transmitter) that are configured to receive RF signals within a particular frequency band from a terrestrial satellite station (or from another satellite), translate the RF signals to a second particular frequency band, and transmit the RF signals within the second frequency band to another terrestrial satellite station (or another satellite). Typical transponders are associated with 30-70 megahertz (MHz) frequency bands. In satellites that do not include a channelizer, the received beams (e.g., RF signals within the particular frequency bands) are downconverted and routed to output ports for upconversion and transmission via one or more downlink beams having different sub-band spectrum (e.g., different frequency bands having the same size as the receive frequency bands). This process is referred to as "beam-to-beam switching".

In some implementations, the satellite 102 is configured to route signals within finer granularity frequency bands than "transponder-sized" frequency bands (also referred to as "channels"). To illustrate, the channelizer 108 is configured to sub-divide the frequency bands (e.g., the sub-band spectrum) associated with the receive antennas 120-122 into smaller frequency slices, also referred to as "subchannels". For example, the channelizer 108 is configured to demultiplex one or more outputs of the AFE 106 into multiple slices (e.g., subchannels), and each channel is routed through the switch matrix 110. In a particular implementation, each subchannel is a sub-band of approximately 31 kilohertz (kHz). In other implementations, the subchannels have other sizes.

In the particular implementation illustrated in FIG. 1, the channelizer 108 is configured to divide each input beam spectrum (e.g., frequency band) from each of the input ports 124-126 into eight input subchannels (e.g., frequency slices). In other implementations, the channelizer 108 divides each input beam spectrum into more than eight or fewer than eight input subchannels. Although referred to as frequency slices or subchannels, in other implementations, signals may also be divided into time-based channels or subchannels (e.g., for time-division multiple access (TDMA) signals) or code-based channels or subchannels (e.g., for code-division multiple access (CDMA) signals). After being switched by the switch matrix 110, the subchannels are combined by the combiner 112. To illustrate, the combiner 112 includes circuitry configured to re-assemble the plurality of subchannels received from the switch matrix 110 into sub-bands for transmission via the transmit antennas 130-132. For example, the combiner 112 may be configured to combine a first plurality of subchannels into a first sub-band to be provided to the first output port 134, to combine a second plurality of subchannels into a second sub-band to be provided to the second output port 135, and to combine a Mth plurality of subchannels into a Mth sub-band to be provided to the Mth output port 136.

In some implementations, the payload 104 optionally includes a regenerator configured to perform further processing on digital data encoded in the various frequency slices/subchannels. For example, the regenerator may include a processor and a memory, a controller, one or more ASICs, one or more FPGAs, or other combinations of circuitry configured to demodulate the data, perform additional processing, and remodulate the data prior to transmission via the transmit antennas 130-132. The additional analysis includes access verification, encryption, code division multiplexing (e.g., CDMA), data regeneration (e.g., recovery of corrupt or unclear data), compression, packet switching, other data processing, or a combination thereof, as non-limiting examples. Demodulation and remodulation may occur at any suitable stage on-board the satellite 102. For example, demodulation may occur before or after channelization (e.g., via the channelizer 108), and remodulation may occur before or after combination (e.g., via the combiner 112).

In implementations that include the channelizer 108 and the combiner 112, the switch matrix 110 is configured to route the input subchannels from the respective input ports to assigned respective output ports. The switch matrix 110 may be configured to perform in-beam and/or cross-beam point-to-point switching (e.g., routing), in-beam and/or cross-beam multicast switching, in-beam and/or cross-beam broadcasting, or a combination thereof. As an illustrative example, the channelizer 108 may perform in-beam point-to-point switching by switching the first subchannel of the first input port 124 to the first subchannel of the first output port 134, and the channelizer 108 may perform cross-beam point-to-point switching by switching the third subchannel of the Nth input port 126 to the eighth subchannel of the second output port 135. As another illustrative example, the channelizer 108 may perform in-beam multicast switching by switching the third subchannel of the first input port 124 to multiple subchannels (e.g., the second, third, and fourth subchannels) of the first output port 134, and the channelizer 108 may perform in-beam and cross-beam multicast switching by switching the eighth subchannel of the first input port 124 to the fifth subchannel of the first output port 134 and to the second and fourth subchannels of the second output port 135. The specific switching illustrated in FIG. 1 is for illustrative purposes and is not intended to be limiting. In other implementations, other switching is performed.

To control the configuration of the switch matrix 110, the satellite 102 includes a switching manager 116. In a particular implementation, the switching manager 116 includes dedicated circuitry, a processor, a controller, an ASIC, a FPGA, or a combination thereof, configured to control the configuration of the switch matrix 110. In other implementations, the operations of the switching manager 116 may be performed by a processor or other system on-board the satellite 102. The switching manager 116 is configured to initialize or modify the configuration of the switch matrix 110. For example, the switching manager 116 is configured to operate one or more switches of the switch matrix 110 (e.g., using control signals), to set filter coefficients or other parameters of the switch matrix 110, or a combination thereof. To illustrate, the switching manager 116 is configured to instantiate one or more permutation tables and to configure elements of the switch matrix 110 based on the one or more permutation tables. For example, each permutation table may indicate a different configuration of the switches within the switch matrix 110 such that one or more channels or subchannels (e.g., frequency slices) are routed from particular input ports to particular output ports. In some implementations, the switching manager 116 is configured to control the configuration of the switch matrix 110 (e.g., to instantiate permutation tables) based on information or instructions received from other components of the satellite 102 or from systems that are external to the satellite 102 (e.g., systems located on a different satellite or terrestrial systems), as further described herein.

The satellite 102 further includes a resource manager 140 configured to control configuration of one or more switch matrices of one or more vehicles. To illustrate, the resource manager 140 may control configuration of the switch matrix 110 to initialize or modify a communications path throughout the satellite 102. In some implementations, the resource manager 140 includes or corresponds to a digital payload resource manager (DPRM). Although illustrated as being integrated in the satellite 102, in other implementations, the resource manager 140 is external to the satellite 102 and configured to communicate with the satellite 102 via a satellite communications link, as further described with reference to FIG. 2. Although described with respect to generating switching configuration data for a single vehicle (e.g., the satellite 102), in other implementations, the resource manager 140 generates switching configuration data for multiple vehicles, as further described with reference to FIG. 2.

The resource manager 140 is configured to generate switching configuration data 142 to enable a particular routing of one or more signals (or frequency slices/subchannels) from one or more of the input ports 124-126 to one or more of the output ports 134-136. The switching configuration data 142 indicates states of one or more switches of the plurality of switches of the switch matrix 110 (e.g., the switching configuration data 142 includes one or more filter configurations or coefficients, one or more permutation tables, or a combination thereof, associated with routing one or more frequency slices associated with a RF signal received at one or more of the receive antennas 120-122 to one or more of the transmit antennas 130-132). To illustrate, the switching configuration data 142 may include a configuration of switches that causes a first subchannel associated with the first input port 124 to be switched to a subchannel associated with the first output port 134 and that causes a second subchannel associated with the first input port 124 to be switched to a subchannel associated with the second output port 135 (e.g., the switching configuration data 142 indicates a configuration that includes two communications paths), as a non-limiting example.

To enable configuration (or reconfiguration) of the switch matrix 110, the resource manager 140 is configured to send the switching configuration data 142 to the switching manager 116. To illustrate, the resource manager 140 is configured to send the switching configuration data 142 to the switching manager 116 via a bus (or other on-board communications medium). In alternate implementations in which the resource manager 140 is external to the satellite 102, the resource manager 140 is configured to send the switching configuration data 142 to the switching manager 116 of the satellite 102 via a wireless feederlink (or other satellite communications medium).

The switching configuration data 142 may be based on network information and requests for communications paths between a first external network and a second external network. To illustrate, the resource manager 140 is configured to receive a request 148 associated with a communications path from a first device to a second device. The communications path includes components of the payload 104 of the satellite 102. As a particular example, the communications path corresponds to a communications path between a first device (e.g., a mobile device, a computing device, a customer edge router, etc.) of a first external network and a second device (e.g., a mobile device, a computing device, a customer edge router, etc.) of a second external network via the switch matrix 110 (and one or more other components).

The request 148 may be received from device(s) on the ground (e.g., a terrestrial device) via a satellite connection, such as a wireless feederlink. The device(s) include devices of one or more external networks (e.g., customer edge routers of networks communicatively coupled to the satellite-based network), devices of a Tier-2 operator that purchases or leases capacity and access to the satellite-based network, or devices of the satellite-based network (e.g., the operations center or another device, such as a gateway, that are configured to communicate via satellite communications), as non-limiting examples. To illustrate, as further described with reference to FIG. 2, the communications path may include a path from a device of a first external network to a device of a second external network via a satellite-based network that includes the satellite 102. The satellite-based network includes at least one terrestrial transmitter configured to transmit an uplink beam to the satellite 102, at least one terrestrial receiver configured to receive a downlink beam from the satellite 102, or a combination thereof. The communications path traverses at least one receive antenna of the satellite 102, on-board components of the payload 104 including the switch matrix 110, and at least one transmit antenna of the satellite 102.

In a particular implementation, the request 148 includes a request for establishing the communications path. For example, the request 148 may include or correspond to a request to establish a new communications path from a first device of the first external network to a second device of the second external network via components of the satellite 102, such as the AFE 106, the channelizer 108, the switch matrix 110, the combiner 112, and the ABE 114. In another particular implementation, the request 148 includes a request for modifying an existing communications path. For example, the request 148 may include or correspond to a request to modify the communications path from the first device of the first external network to the second device of the second external network by causing the communications path to traverse one or more different components of the payload 104 (e.g., to be received via a different receive antenna, to be transmitted via a different transmit antenna, etc.). In another particular implementation, the request 148 includes a request for terminating the communications path. For example, the request 148 may include or correspond to a request to terminate a particular communications path, and the resources used to provide the communications path may be reconfigured to provide other communications paths based on other requests.

In some implementations, the request 148 is received from a network operator. For example, a network operator of an external network sends the request 148 to the satellite-based network associated with the satellite 102, and the request 148 is forwarded to the satellite 102. In other implementations, the request 148 is generated based on data communications received at the satellite-based network. For example, a component of the satellite-based network may generate the request 148 responsive to receiving a data packet that indicates the first device as the originator and that indicates the second device as the destination. In this manner, the satellite-based network may be configured to provide automatic communications path instantiation (e.g., without being configured by a human network operator).

In a particular implementation, the resource manager 140 is configured to generate the switching configuration data 142 based on network topology data 144 (e.g., network routing topology data) associated with the communications path indicated by the request 148. The network topology data 144 indicates connections between a plurality of network devices associated with one or more networks (e.g., the first external network and the second external network). The resource manager 140 is configured to receive the network topology data 144 from one or more network devices of the one or more networks (e.g., from one or more routers or other network nodes of the first external network and the second external network). The resource manager 140 is configured to generate a permutation table (or other switching configuration data) that enables formation, modification, or removal of the communications path based on the network topology data 144.

In some implementations, the resource manager 140 is further configured to generate the switching configuration data 142 based on signaling data 146 (e.g., signaling control data). The signaling data 146 indicates information associated with one or more label-switched paths (LSPs) through one or more external networks (e.g., through the first external network and the second external network). The resource manager 140 is configured to receive the signaling data 146 from one or more network devices of the one or more networks (e.g., the first external network and the second external network). In a particular implementation, the network topology data 144 is received in accordance with a constraint-based routing protocol, such as a resource reservation protocol traffic engineering (RSVP-TE) protocol, and the signaling data 146 is received in accordance with a signaling protocol, such as a resource reservation protocol traffic engineering (RSVP-TE) protocol. The constraint-based routing protocol and the signaling protocol may be part of a larger standard protocol suite, such as a generalized multiprotocol label switching (GMPLS) protocol suite or an OPENFLOW protocol suite, as non-limiting examples.

To illustrate, the resource manager 140 is configured to communicate with devices of other external networks in "the routing plane" (e.g., to communicate the network topology data 144) and in "the signaling plane") (e.g., to communicate the signaling data 146). This may also be referred to as the resource manager 140 being "in the control plane" (as compared to the "data plane", which refers to the components within communications paths of the communications data that is routed across the various networks). The resource manager 140 is configured to translate the network information (e.g., the network topology data 144 and the signaling data 146) to cross-connects of the switch matrix 110 in order to generate the switching configuration data 142. In this manner, the resource manager 140 enables the satellite 102 to perform the functionality of label-switch routing (e.g., based on the network information) without demodulating data on-board the satellite 102 to extract labels and route data accordingly.

For example, a first data packet encapsulated with a first label by the first external network is received by a terrestrial component of the satellite-based network (e.g., a router coupled to a satellite dish or other transmitter configured to transmit an uplink beam to the satellite 102). Instead of generating a new label to encapsulate the data packet based on the link from the router to the satellite 102 (as is done by a label-switched router), the router of the satellite-based network generates a RF signal based on a carrier within a particular frequency sub-band (e.g., a particular subchannel) and combines the RF signal with other RF signals to generate an uplink beam that is transmitted to the satellite 102. The particular frequency sub-band is mapped to the particular network path and label based on the network topology data 144 and the signaling data 146. On-board the satellite 102, the uplink beam is received at a receive antenna, such as the first receive antenna 120 and processed by the AFE 106. The channelizer 108 sub-divides the uplink beam into a plurality of subchannels including the particular subchannel, and the particular subchannel is switched through the switch matrix 110 based on a configuration indicated by the switching configuration data 142 (e.g., a particular permutation table). The switching configuration data 142 causes the switch matrix 110 to switch the particular subchannel to a target output port for transmission from a target transmit antenna as a downlink beam to a terrestrial receiver (or to another one or more satellites prior to reaching the terrestrial receiver).

In this manner, traffic associated with different labels, with different providers, etc., are switched through the switch matrix 110 according to different paths based on the network topology data 144 and the signaling data 146. For example, traffic associated with a second label (indicating a path originating at a different external network) may be transmitted to the antenna using carriers associated with different subchannels (or different uplink beams), and the different subchannels (or different uplink beams) are switched differently through the switch matrix 110. By configuring the switch matrix 110 based on the switching configuration data 142 that is based on the network topology data 144 and the signaling data 146, the satellite 102 is able to route traffic associated with different labels according to different paths without performing on-board demodulation to extract the labels. Thus, traffic from different external networks or different providers is able to be logically isolated and switched on-board the satellite 102 via different communications paths. Additionally or alternatively, traffic of a single network (or provider) can be routed differently based on traffic constraints, such as quality of service (QoS), link quality, etc. For example, traffic associated with different constraints may have different labels, and thus the traffic may be isolated and switched independently on-board the satellite 102.

In a particular implementation, the resource manager 140 is configured to generate the switching configuration data 142 based on network traffic patterns (e.g., user plane traffic patterns). To illustrate, the resource manager 140 is configured to monitor user data propagated within the satellite-based network to determine the user plane traffic patterns. Based on the user plane traffic patterns, the resource manager 140 generates the switching configuration data 142. For example, the resource manager 140 may determine a first configuration of the switch matrix 110 to account for periods of high traffic associated with a particular user or group of users, and the resource manager 140 may determine a second configuration of the switch matrix 110 to account for periods of less traffic. Thus, the resource manager 140 generates the switching configuration data 142 to indicate one or more network-traffic-based configurations of the switch matrix 110.

In some implementations, the resource manager 140 is configured to interact with external networks according to a partial-peering model. In such implementations, the resource manager 140 does not share communications path data with other networks. To illustrate, data indicating link quality, link speed, etc., associated with the satellite 102 is not provided to other networks. Thus, in partial peering models, each network (e.g., an external network or the satellite-based network) is operated as a distinct network that knows information about its own components but not information about the other networks.

In some implementations, the resource manager 140 is configured to interact with external networks according to a full-peering model. In such implementations, the resource manager 140 shares communications path data with other networks. To illustrate, data indicating communications paths through the satellite-based network, including on-board communications paths, link quality, link speed, etc., is shared with other networks. Thus, in full-peering models, all of the networks are treated as a single network that operates according to a specific protocol or suite of protocols, enabling routing and signaling to be designed to meet end-to-end criteria, such as QoS criteria, and to enable communications according to provider-specific rules. In an alternate implementation, the resource manager 140 generates the switching configuration data 142 based on data received from an operator at the operations center (e.g., the satellite-based network interacts with other networks according to an overlay model).

During operation, the resource manager receives the request 148. The request 148 may originate at an external network. Based on the request 148, the network topology data 144, and the signaling data 146, the resource manager 140 generates the switching configuration data 142. In a particular implementation, the switching configuration data 142 indicates a configuration of the switch matrix 110. The resource manager 140 sends the switching configuration data 142 to the switching manager 116, and the switching manager 116 configures the switch matrix 110 based on the switching configuration data 142. Configuration of the switch matrix 110 enables switching of signals from the receive antennas 120-122 to the transmit antennas 130-132 to enable data routing via the satellite 102.

By generating switching configuration data based on the network information (e.g., the network topology data 144 and the signaling data 146), the satellite-based network is able to perform the functionality of a label-switched router even though the communications data is not demodulated on-board the satellite 102 to extract labels for use in configuring the switch matrix 110. Because the resource manager 140 generates the switching configuration data 142 based on requests and network information (e.g., the network topology data 144 and the signaling data 146), the resource manager 140 enables automated configuration of the switch matrix 110, as compared to other satellite-based networks in which an operator in an operations center generates configuration data for use at the satellite 102. FIG. 1 thus illustrates an implementation of a satellite (e.g., the satellite 102) in which the data plane (e.g., the AFE 106, the channelizer 108, the switch matrix 110, the combiner 112, and the ABE 114) and the control plane (e.g., the switching manager 116 and the resource manager 140 that stores the network topology data 144 and the signaling data 146) are co-located on-board the satellite 102. In other implementations, the data plane may be located on the ground (e.g., in a ground-based operations center), which enables legacy satellites that do not perform on-board resource management functionality to perform the operations of a label-switched router under control of one or more ground-based components, as further described with reference to FIG. 2. Because the satellite-based network is able to perform label-switched routing functionality, the satellite-based network and external networks are able to be operated as a single network. Operating multiple networks as though they are a single larger network enables traffic-engineering across multiple networks such that communications paths across multiple networks may be selected that meet various end-to-end criteria, such as QoS criteria. Additionally, particular rules or policy (e.g., provider-specific rules or policy) can be supported by communications paths across multiple networks via use of control information formatted according to one or more protocols with the external networks, as compared to other satellite-based networks that do not use control information having the same format as IP-switched networks.

In the above description, various functions performed by the system 100 of FIG. 1 are described as being performed by the components 106, 108, 110, 112, 114, 116, and 140. This is for illustration only. In other implementations, one or more of the components 106, 108, 110, 112, 114, 116, and 140 may be integrated in a single component that performs functions associated with multiple components. Each of the components 106, 108, 110, 112, 114, 116, and 140 may be implemented using hardware (e.g., a field-programmable gate array (FPGA) device, an application-specific integrated circuit (ASIC), a digital signal processor (DSP), a controller, etc.), software (e.g., instructions executable by a processor), or a combination thereof.

Figure 2:
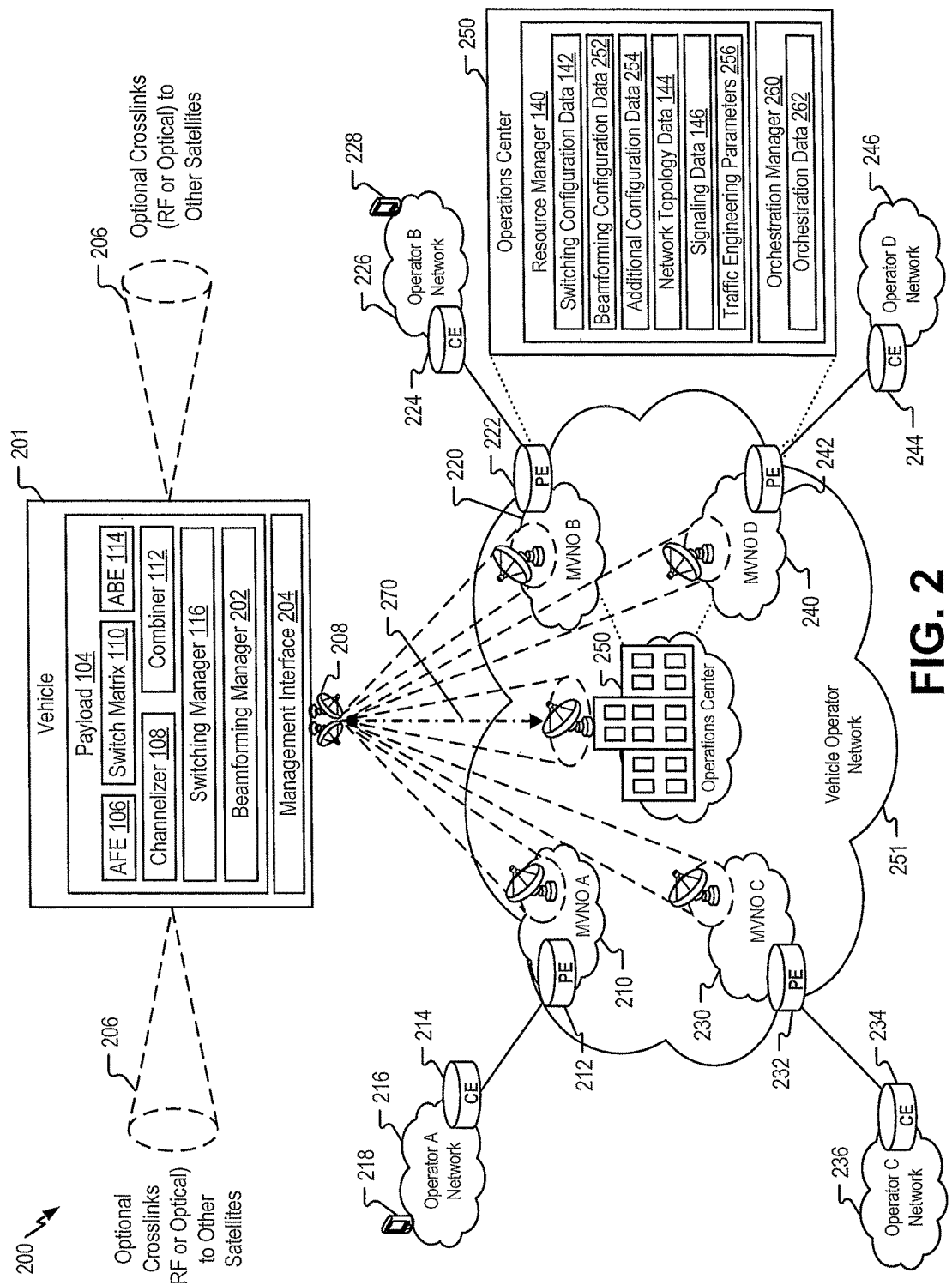
FIG. 2 is a block diagram that illustrates a first illustrative implementation of a communications system that includes a vehicle-based network having a switch matrix on-board a vehicle that is configured based on network control plane information or user plane traffic patterns.

FIG. 2 depicts a first example of an illustrative implementation of a system 200 including a vehicle-based network having a switch matrix on-board a vehicle that is configured based on network information (e.g., network topology data, signaling data, or both). The system 200 includes a vehicle 201, a vehicle operator network 251 (e.g., a vehicle-based network), a first external network 216 ("Operator A Network"), a second external network 226 ("Operator B Network"), a third external network 236 ("Operator C Network"), and a fourth external network 246 ("Operator D Network"). Although four external networks are illustrated in FIG. 2, in other implementations, the system 200 includes fewer than four or more than four external networks. The vehicle operator network 251 includes or corresponds to a core network.

The vehicle 201 includes a spacecraft or an aircraft and is distinct from ground-based (e.g., terrestrial) devices, such as devices of the external networks 216, 226, 236, and 246 and other devices of the vehicle operator network 251. In a particular implementation, the vehicle 201 includes a satellite. In another particular implementation, the vehicle 201 includes a space shuttle. In another particular implementation, the vehicle 201 includes a UAV (e.g., a drone aircraft). Although illustrated in FIG. 2 as including a single vehicle, in other implementations, the system 200 includes a plurality of vehicles (e.g., a constellation of vehicles).

In a particular implementation, the vehicle 201 includes the payload 104 including the AFE 106, the channelizer 108, the switch matrix 110, the combiner 112, the ABE 114, and the switching manager 116, as described with reference to FIG. 1. In other implementations, one or more of the components 106, 108, 112, and 114 are not included in the vehicle 201. The payload 104 also includes antenna arrays 208. The antenna arrays 208 include multiple receive antennas and multiple transmit antennas. In a particular implementation, the antenna arrays 208 include the receive antennas 120-122 and the transmit antennas 130-132 as described with reference to FIG. 1.

The payload 104 further includes a beamforming manager 202. The beamforming manager 202 is configured to perform beamforming with respect to one or more of the output beams at output ports of the vehicle 201. For example, the beamforming manager 202 may control the phase or amplitude of signals that are provided to various output ports to change a direction or shape of a transmit beam generated by one or more transmit antennas. To illustrate, the beamforming manager 202 performs one or more beamforming operations (e.g., the beamforming manager 202 modifies a phase or amplitude of one or more signals) based on beamforming weights, phase values, amplitude values, or other information received from the resource manager 140.

The vehicle 201 further includes a management interface 204. The management interface 204 is configured to provide network data associated with the components of the vehicle 201, such as components of the payload 104, to a ground-based operations center 250, to a ground-based network device (e.g., one or more terrestrial devices of the networks 216, 226, 236, 246, and 251), or both. For example, the management interface 204 may be configured to provide network-specific or operator-specific measurement data (e.g., data measuring communications operations performed by the vehicle 201 that include signals and data from the network or provider), ephemeris data, or both, to devices of one or more of the networks 216, 226, 236, and 246, or to provide vehicle-centric measurement data (e.g., data measuring communications operations associated with the vehicle-based network), ephemeris data, or both, to the ground-based operations center 250.

The vehicle 201 is configured to support the vehicle operator network 251 by receiving RF signals in one or more uplink beams from the ground and transmitting RF signals to another location on the ground (or to one or more other vehicles) via one or more downlink beams. In some implementations, the vehicle 201 is configured to transmit downlink beams to one or more other vehicles (e.g., satellites, shuttles, drone aircraft, etc.) via optional crosslinks 206. The optional crosslinks 206 include RF crosslinks or optical crosslinks. Communicating via the optional crosslinks 206 with other vehicles enables the system 200 to include multiple vehicles, which may enable the vehicle operator network 251 to have expanded coverage area as compared to using a single vehicle. For example, each vehicle within the vehicle operator network 251 has an area of coverage that contributes to the total coverage area of the vehicle operator network 251.

The vehicle operator (e.g., a Tier-1 operator) may sell access or lease access to the vehicle operator network 251 to other closed user groups ("CUGs") to provide various network services. As used herein, "CUGs" refers to Tier-2 operators (e.g., service providers) that pay for access to equipment associated with a Tier-1 operator. For convenience, a member of a CUG is referred to as a user. Tier-2 operators include mobile virtual network operators (MVNOs) and virtual network operators (VNOs), as non-limiting examples. A person who subscribes to a service provided by a Tier-2 operator is referred to herein as a subscriber. In the particular implementation illustrated in FIG. 2, access is sold or leased to a first MVNO 210 ("MVNO A") associated with a first Tier-2 operator (Operator A) that operates the first external network 216, a second MVNO 220 ("MVNO B") associated with a second Tier-2 operator (Operator B) that operates the second external network 226, a third MVNO 230 ("MVNO C") associated with a third Tier-2 operator (Operator C) that operates the third external network 236, and a fourth MVNO 240 ("MVNO D") associated with a fourth Tier-2 operator (Operator D) that operates the fourth external network 246. Although described as MVNOs, in other implementations, different types of Tier-2 operators (e.g., VNOs, the government, etc.) are included. Although four Tier-2 operators are illustrated in FIG. 2, in other implementations, more than four or fewer than four Tier-2 operators may purchase or lease access to the vehicle operator network 251.

Components of the vehicle operator network 251 and the external networks 216, 226, 236, and 246 are configured to send and receive data traffic. For example, the vehicle operator network 251 includes a first provider edge router 212 configured to communicate with a first customer edge router 214 of the first external network 216, a second provider edge router 222 configured to communicate with a second customer edge router 224 of the second external network 226, a third provider edge router 232 configured to communicate with a third customer edge router 234 of the third external network 236, and a fourth provider edge router 242 configured to communicate with a fourth customer edge router 244 of the fourth external network 246. Although illustrated as four distinct provider edge routers 212, 222, 232, and 242, in other implementations, the vehicle operator network 251 includes more than four or fewer than four provider edge routers. For example, a single provider edge router may communicate with each of the customer edge routers 214, 224, 234, and 244.

In a particular implementation, each customer edge routers 214, 224, 234, and 244 is configured to strip all external-network specific labels or other headers from data traffic prior to providing data traffic to the corresponding provider edge router of the vehicle operator network 251, and each of the provider edge routers 212, 222, 232, and 242 is configured to strip all vehicle operator network 251-specific labels and headers prior to providing data traffic to the corresponding customer edge router.

For example, in implementations in which the networks 216, 226, 236, 246, and 251 interact according to a partial peering model, data traffic (e.g., IP traffic) originating within the first external network 216 and having a destination within the second external network 226 is encapsulated and routed among the first external network 216 using one or more labels specific to the first external network 216, and when data traffic is to be sent to the vehicle operator network 251, the first customer edge router 214 strips the network-specific labels from the data traffic and forwards the data traffic to the first provider edge router 212. The first provider edge router 212 may encapsulate the data traffic and route the data traffic through components of the vehicle operator network 251 to the vehicle 201 for transmission to a different location. For example, the data traffic may be encapsulated and routed to a gateway router that is coupled to a satellite dish or other component configured to transmit an uplink beam that includes the data traffic to the vehicle 201.

The data traffic may be routed through components of the vehicle 201, such as the switch matrix 110, and transmitted to a satellite dish (or other component) coupled to a second gateway router at a different location via a downlink beam from the vehicle 201. The data traffic may be encapsulated and routed through additional components of the vehicle operator network 251 to the second provider edge router 222. In a particular implementation, the second provider edge router 222 is configured to strip any of the labels (or other headers) specific to the vehicle operator network 251 and to provide the data traffic to the second customer edge router 224, which is configured to encapsulate and route the data traffic to its destination within the second external network 226.

In implementations in which the networks 216, 226, 236, 246, and 251 interact according to a full peering model, the customer edge routers 214, 224, 234, and 244 and the provider edge routers 212, 222, 232, and 242 are configured to maintain labels or other header information when routing packets between networks. To illustrate, because the networks 216, 226, 236, 246, and 251 share routing and signaling information, labels and other routing information associated with one network may be used (or translated and used) by other networks. Sharing routing and signaling information between networks allows the networks to be operated as though they are a single network such that various criteria and rules can be managed via control communications in a single control plane.

In addition to providing various types of interaction between the networks (e.g., overlay, partial peering, or full peering), the vehicle operator network 251 is configured to isolate network traffic within the vehicle operator network 251. In a particular implementation, the vehicle operator network 251 is configured to provide per-user (e.g., per-Tier-2 operator or per-service provider) network traffic isolation within the vehicle operator network 251. To implement per-user network traffic isolation, traffic associated with different CUGs is encapsulated differently and is routed and forwarded through the vehicle operator network 251 using different routing information. In a particular implementation, network components of the vehicle operator network 251 (e.g., base stations, mobile management entities, packet gateways, serving gateways, etc.) are configured to encapsulate traffic associated with different CUGs (e.g., different MVNOs) using different identifiers.

To illustrate, in a particular implementation, the network components maintain different virtual routing and forwarding (VRF) instances for each user, which includes maintaining different routing information base (RIB) data for each user. Due to the different RIB data, traffic associated with a first user may traverse a different path through an external network than traffic associated with a second user. In a particular implementation, the networking components maintain a first VRF instance for the first MVNO 210, a second VRF instance for the second MVNO 220, a third VRF instance for the third MVNO 230, and a fourth VRF instance for the fourth MVNO 240. In other implementations, some components of the vehicle operator network 251 are designated for particular MVNOs (or other tier-2 operators) and therefore maintain only the corresponding VRF instances and related RIB data (instead of maintaining RIB data for each VRF within the vehicle operator network 251).

In a particular implementation, gateway routers of the vehicle operator network 251 are configured to generate the uplink beams to provide logical isolation of traffic, or to provide isolation of traffic based on particular criteria. To illustrate, a gateway router may include a plurality of modem banks and may receive first traffic associated with the first MVNO 210 at a first modem bank and second traffic associated with the second MVNO 220 at the second modem bank. The first modem bank generates a first signal within a first frequency band based on the first traffic and the second modem bank generates a second signal within a second frequency band based on the second traffic. The first signal and the second signal are combined into an uplink beam that is transmitted to the vehicle 201. As described with reference to FIG. 1, the switch matrix 110 is configured, based on the switching configuration data 142, to switch the first signal along a first communications path and to switch the second signal along a second communications path. The switching configuration data 142 is generated based on the network topology data 144 and the signaling data 146, which in some implementations includes VRF-specific network topology data and VRF-specific signaling data. In this manner, the vehicle 201 provides logical isolation of network traffic on a per-user basis. Alternatively, the first traffic and the second traffic may correspond to traffic of the same provider (e.g., a Tier-2 provider) having different criteria, such as QoS criteria, and the traffic may be routed differently to meet the different criteria (e.g., the first communications path may be more reliable or be associated with a faster end-to-end travel time than the second communications path).

To control the vehicle 201, the vehicle operator network 251 includes the ground-based operations center 250. In the particular implementation illustrated in FIG. 2, the resource manager 140 is integrated within or included in the ground-based operations center 250. For example, the ground-based operations center 250 includes one or more computing systems (e.g., one or more processors and memories) configured to perform the operations described with reference to the resource manager 140. In other implementations, the resource manager 140 is distributed among multiple components of the vehicle operator network 251 (instead of being located only at the ground-based operations center 250). To illustrate, resource manager clients may be included in multiple resource gateways, as well as the ground-based operations center 250, such that performance of the operations of the resource manager 140 is distributed across the resource gateways and the ground-based operations center 250. In a particular implementation, the ground-based operations center 250 is configured to generate control data for operating the vehicle 201 and the functions of the resource manager 140 are distributed across the resource gateways and are not performed by the ground-based operations center 250. As described with reference to FIG. 1, the resource manager 140 is configured to generate the switching configuration data 142 based on the network topology data 144 and the signaling data 146 (and based on one or more requests, such as the request 148 of FIG. 1).

The ground-based operations center 250 is communicatively coupled to the vehicle 201 via a wireless communications link 270, also referred to as a wireless feederlink. The wireless communications link 270 includes a RF link or a microwave link, as non-limiting examples. In implementations in which the vehicle 201 is a satellite, the wireless communications link 270 is a satellite communications link. The resource manager 140 is configured to transmit control and management data to the vehicle 201 via the wireless communications link 270. The control and management data is distinct from the data traffic that is included in one or more uplink beams sent to the vehicle 201 from a first location (or first group of locations) on the ground and that is to be routed on-board the vehicle 201 and transmitted as part of one or more downlink beams to a second location (or second group of locations) on the ground. For example, the resource manager 140 is configured to send the switching configuration data 142 to the vehicle 201 via the wireless communications link 270, and the switching manager 116 is configured to control the switch matrix 110 based on the switching configuration data 142, as described with reference to FIG. 1.

To illustrate, the switch matrix 110 may be configured based on the switching configuration data 142 to initialize or modify a communications path between a first device and a second device. In a particular implementation, the first device is a first ground-based device that is communicatively coupled to a first network associated with a first provider and the second device is a second ground-based device that is communicatively coupled to a second network associated with a second provider. For example, the first device may include a first subscriber device 218 that is communicatively coupled to the first external network 216 of Operator A and the second device may include a second subscriber device 228 that is communicatively coupled to the second external network 226 of Operator B. The first device and the second device may include mobile devices, such as mobile phones, tablet computers, laptop computers, smart watches, media playback devices, navigation systems, personal digital assistants (PDAs), satellite phones, vehicles (or components thereof), or a combination thereof, as non-limiting examples, or stationary computerized devices. As another example, the first device may include the first customer edge router 214 and the second device may include the second customer edge router 224 (e.g., routing among the networks 216 and 226 may not be visible to the vehicle operator network 251, for example because the networks 216, 226, and 251 interact according to a partial peering model). The first provider may be a first virtual network operator (e.g., may operate the first MVNO 210) that is associated with a first VRF instance and the second provider may be a second virtual network operation (e.g., may operate the second MVNO 220) that is associated with a second VRF instance. The switch matrix 110 may be configured based on the switching configuration data 142 such that a first output beam that is generated at a first transmit antenna of the vehicle 201 is based on at least a portion of a frequency spectrum of a first receive beam at a first receive antenna of the vehicle 201 (e.g., a communications path associated with a particular subchannel may be set from a particular input port through the switch matrix 110 to a particular output port). Switching data that initializes (or modifies) additional communications paths may be generated based on the network topology data 144, the signaling data 146, and one or more other requests.

In a particular implementation, the resource manager 140 is further configured to generate beamforming configuration data 252 based on the network topology data 144, the signaling data 146, and a request (e.g., the request 148 of FIG. 1). The beamforming configuration data 252 indicates one or more beamforming weights based on one or more phase values, one or more amplitude values, or a combination thereof. The resource manager 140 is configured to send the beamforming configuration data 252 to the vehicle 201 via the wireless communications link 270, and the beamforming manager 202 is configured to adjust RF signals to be output by the vehicle 201 (e.g., by adjusting phase or amplitude of the RF signals) based on the beamforming configuration data 252. Adjusting the RF signals is also referred to as applying the beamforming weights to the RF signals. By applying the beamforming weights to the RF signals, RF signals associated with different providers, with different traffic types or criteria, or a combination thereof, can be beamformed in different ways (e.g., having different directions, beam shapes, etc.) from the antenna array 208 (e.g., from one or more transmit antennas).

In another particular implementation, the resource manager 140 is configured to generate additional configuration data 254 based on the network topology data 144, the signaling data 146, and a request (e.g., the request 148 of FIG. 1). The additional configuration data 254 indicates configurations or parameter values associated with one or more other components of the payload 104 (e.g., components other than the switch matrix 110). For example, the one or more components may include the AFE 106, the channelizer 108, the combiner 112, the ABE 114, a regenerator, or a combination thereof. The resource manager 140 is configured to send the additional configuration data 254 to the vehicle 201 via the wireless communications link 270, and circuitry of the vehicle 201 is configured to configure one or more other components of the payload 104 based on the additional configuration data 254. Configuring the one or more components may adjust bandwidth, power, frequency plans, antenna coverages, etc., associated with signals received at and transmitted from the antenna array 208. For example, adjusting filter coefficients or local oscillator signals associated with the AFE 106 or the ABE 114 adjusts the bandwidths of received signals that are processed or the bandwidths of signals that are transmitted from the vehicle 201. As another example, adjusting parameters of the channelizer 108 or the combiner 112 adjusts the number of subchannels that are subdivided from each signal, the width of the subchannels, the particular ranges for each subchannel, the number of subchannels that are combined to form an output channel, the width of the output channels, the ranges of the output channels, or a combination thereof. As another example, adjusting parameters associated with one or more amplifiers of the ABE 114 adjusts the energy (e.g., transmit power) of signals that are transmitted from the vehicle 201.

In another particular implementation, the resource manager 140 is configured to receive one or more traffic engineering parameters 256 from devices of the networks 216, 226, 236, 246, and 251. The one or more traffic engineering parameters 256 include a QoS parameter, a network-specific policy parameter, other speed or reliability parameters, or a combination thereof. The resource manager 140 is further configured to generate the switching configuration data 142 based on the one or more traffic engineering parameters 256. For example, the one or more traffic engineering parameters 256 may indicate a QoS type associated with particular data traffic (e.g., video, voice, data, etc.), and the resource manager 140 may generate the switching configuration data 142 such that a communications path for the particular data meets criteria (e.g., reliability, number of links, redundancy, end-to-end travel time, etc.) associated with the corresponding QoS type. As a particular example, the resource manager 140 may generate a permutation table that switches first data traffic (associated with one or more subchannels) from a first input port to a second output port along a first communications path and that switches second data traffic (associated with one or more other subchannels) from the first input port to a first output port along a second communications path. The first communications path may include an amplifier having a higher output voltage and a transmit antenna having a particular shaped beam such that the first communications path is associated with higher reliability than the second communications path (which includes an amplifier with a lower output voltage and a transmit antenna having a differently shaped beam).

In another particular implementation, the ground-based operations center 250 includes an orchestration manager 260. The orchestration manager 260 is configured to generate orchestration data 262 based on operation of the vehicle 201. To illustrate, the orchestration data 262 indicates one or more orchestrated events associated with operation of the vehicle 201, such as a handover from the vehicle 201 to a second vehicle, a planned outage associated with the vehicle 201, an unplanned outage associated with the vehicle 201, a change in orbit of the vehicle 201, a change in system capacity demand associated with the vehicle 201, a change in user attachment point associated with the vehicle 201, or a combination thereof. The orchestration manager 260 is configured to generate the orchestration data 262 based on commands from an operator (e.g., a human operator) at the ground-based operations center 250 or autonomously based on data generated by the vehicle 201 or the ground-based operations center 250. As a particular example, an operator may input data at the ground-based operations center 250 indicating that an outage is to occur at a particular time. As another particular example, the orchestration manager 260 may receive sensor data from the vehicle 201 indicating that the orbit of the vehicle 201 has changed or data from the ground-based operations center 250 indicating that an estimated link quality of an uplink or a downlink has changed (e.g., due to weather conditions or other measurable conditions). The resource manager 140 is configured to generate the switching configuration data 142 based further on the orchestration data 262. For example, a communications path from a first input port to a first output port may be modified such that the communications path extends from the first input port to a different output port based on the orchestration data 262 indicating a potential change in condition associated with a transmit antenna coupled to the first output port. As another example, if the orchestration data 262 indicates an upcoming planned outage, the switching configuration data 142 may be modified to include a permutation table that enables only signals associated with high priority traffic types (e.g., high priority QoS types) to be routed to output ports until after the planned outage.

The system 200 enables abstraction and encapsulation of switching control at the vehicle 201. For example, the resource manager 140 is configured to translate network topology data and signaling data from other networks (e.g., external networks) into configurations of the switch matrix 110. In this manner, the resource manager 140 is able to control the configuration of the switch matrix 110 (which acts as a circuit-switched network) based on routing and signaling data associated with label-switched or packet-switched networks. To illustrate, the resource manager 140 generates the switching configuration data 142 to control the switch matrix 110 of the vehicle (or switch matrices of a plurality of vehicles) based on control plane protocols, such as a GMPLS protocol suite, an OPENFLOW protocol suite, or other routing and signaling protocols. Because the switch matrix 110 is configured based on the control plane protocols, the vehicle 201 acts as a label-switched router (e.g., performing routing based on the network topology data 144 and the signaling data 146). By translating between the control plane protocols and the point-to-point connections of the switch matrix 110, the infrastructure of the vehicle 201 is effectively "collapsed" into the control plane of the external networks. This enables the vehicle operator network 251 to interact with other networks according to a full-peering model and appear to the other networks as another label-switched (or IP-based) router. In this manner, end-to-end criteria, such as QoS criteria, and network-specific rules and policies can be met by the vehicle operator network 251 operating in combination with the external networks, as compared to vehicle-based networks that operate as a circuit-switched overlay to external networks and are therefore unable to meet the end-to-end criteria.

Thus, FIG. 2 depicts an implementation in which the control plane (e.g., the resource manager 140) is "decoupled" from the data plane (e.g., the AFE 106, the channelizer 108, the switch matrix 110, the combiner 112, and the ABE 114) and located on the ground. Because the resource manager 140 is integrated in the ground-based operations center 250, the vehicle 201 is removed from the control plane. Thus, in the implementation illustrated in FIG. 2, the ground-based operations center 250 (including the resource manager 140) is able to control legacy vehicles (e.g., legacy satellites or other vehicles) to cause the legacy vehicles to appear to other peering devices on the ground to be a label-switched router. For example, a legacy satellite (e.g., a satellite that includes the AFE 106, the channelizer 108, the switch matrix 110, the combiner 112, and the ABE 114 but that is not configured to perform on-board generation of the switching configuration data 142 based on the network topology data 144 and the signaling data 146) can be configured to perform label-switching functionality by receiving the switching configuration data 142 (and other configuration data described with reference to FIG. 2) and configuring the switch matrix 110 (or other components of the payload 104) accordingly. Thus, in some implementations, the present disclosure enables legacy vehicle-based networks to interact with external networks according to partial-peering or full-peering models.

Figure 3:
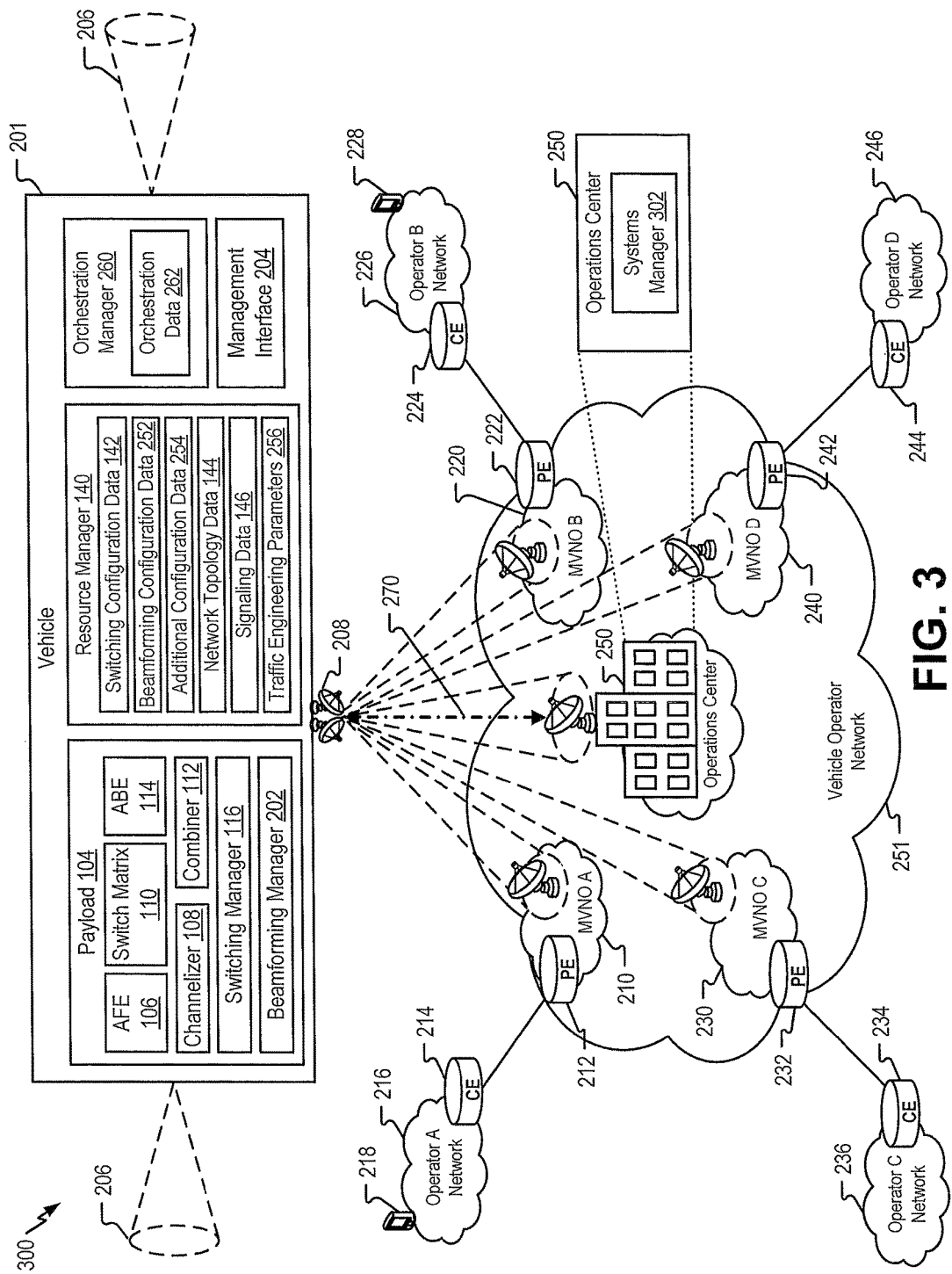
FIG. 3 is a block diagram that illustrates a second illustrative implementation of a communications system that includes a vehicle-based network having a switch matrix on-board a vehicle that is configured based on network control plane information or user plane traffic patterns.

FIG. 3 depicts a second example of an illustrative implementation of a system 300 that includes a vehicle-based network having a switch matrix on-board a vehicle that is configured based on network information (e.g., network topology data, signaling data, or both). The system 300 includes the vehicle 201 and the vehicle operator network 251 that is communicatively coupled to the external networks 216, 226, 236, and 246, as described with reference to FIG. 2. In contrast to the implementation described with reference to FIG. 2, in the system 300, the resource manager 140 and the orchestration manager 260 are integrated on-board the vehicle 201 and not in the ground-based operations center 250. Thus, FIG. 3 illustrates an implementation in which the control plane and the data plane are co-located at the vehicle 201.

In the implementation illustrated in FIG. 3, the ground-based operations center 250 includes a systems manager 302. The systems manager 302 is configured to generate control data to control operation of the vehicle 201 (or a plurality of vehicles). For example, the systems manager 302 may include one or more processors and memories, one or more controllers, one or more ASICs, one or more FPGAs, other circuitry, or a combination thereof, configured to enable an operator to control various operations of the vehicle 201, to autonomously generate control data based on data, such as ephemeris data, from the vehicle 201, or a combination thereof. For example, the systems manager 302 may be configured to generate control data associated with flight path/orbit control, power system control, repair control, or other operations associated with the vehicle 201. The systems manager 302 is configured to provide the control data to the vehicle 201 via the wireless communications link 270, and the vehicle 201 is configured to receive the control data via the management interface 204 and to perform one or more operations based on the control data. For example, the vehicle 201 may adjust a flight path or orbit, adjust a power setting, perform other operations, or a combination thereof, based on the control data.

As illustrated in FIG. 3, the vehicle 201 includes the resource manager 140 and the orchestration manager 260. The resource manager 140 is configured to determine the switching configuration data 142, the beamforming configuration data 252, and the additional configuration data 254 on-board the vehicle 201 based on the network topology data 144, the signaling data 146, optionally the one or more traffic engineering parameters 256, and one or more requests for communications paths through the vehicle 201, such as the request 148 of FIG. 1. The network topology data 144, the signaling data 146, and the one or more traffic engineering parameters 256 (and other additional control data) may be received at the vehicle 201 from one or more ground-based components of the networks 216, 226, 236, 246, and 251. In a particular implementation, components of the external networks 216, 226, 236, and 246 provide respective network topology data and signaling data to the provider edge routers 212, 222, 232, and 242, and the network topology data and signaling data is routed to the ground-based operations center 250 and sent to the vehicle 201 via the wireless communications link 270. In an alternate implementation, the network topology data and the signaling data is routed from the provider edge routers 212, 222, 232, and 242 to one or more resource gateways of the vehicle operator network 251, and the resource gateways send the network topology data and the signaling data to the vehicle 201 via one or more wireless communications links. The one or more traffic engineering parameters 256 may be similarly received from the external networks 216, 226, 236, and 246 at the vehicle operator network 251 and provided to the vehicle 201. Thus, in some implementations, the switching configuration data 142 is generated at the vehicle 201 by the resource manager 140 based on network topology data, signaling data, traffic engineering parameters, other control data, or a combination thereof, received via one or more wireless communications links from the ground-based operations center 250, ground-based network devices, or both.

Figure 4:
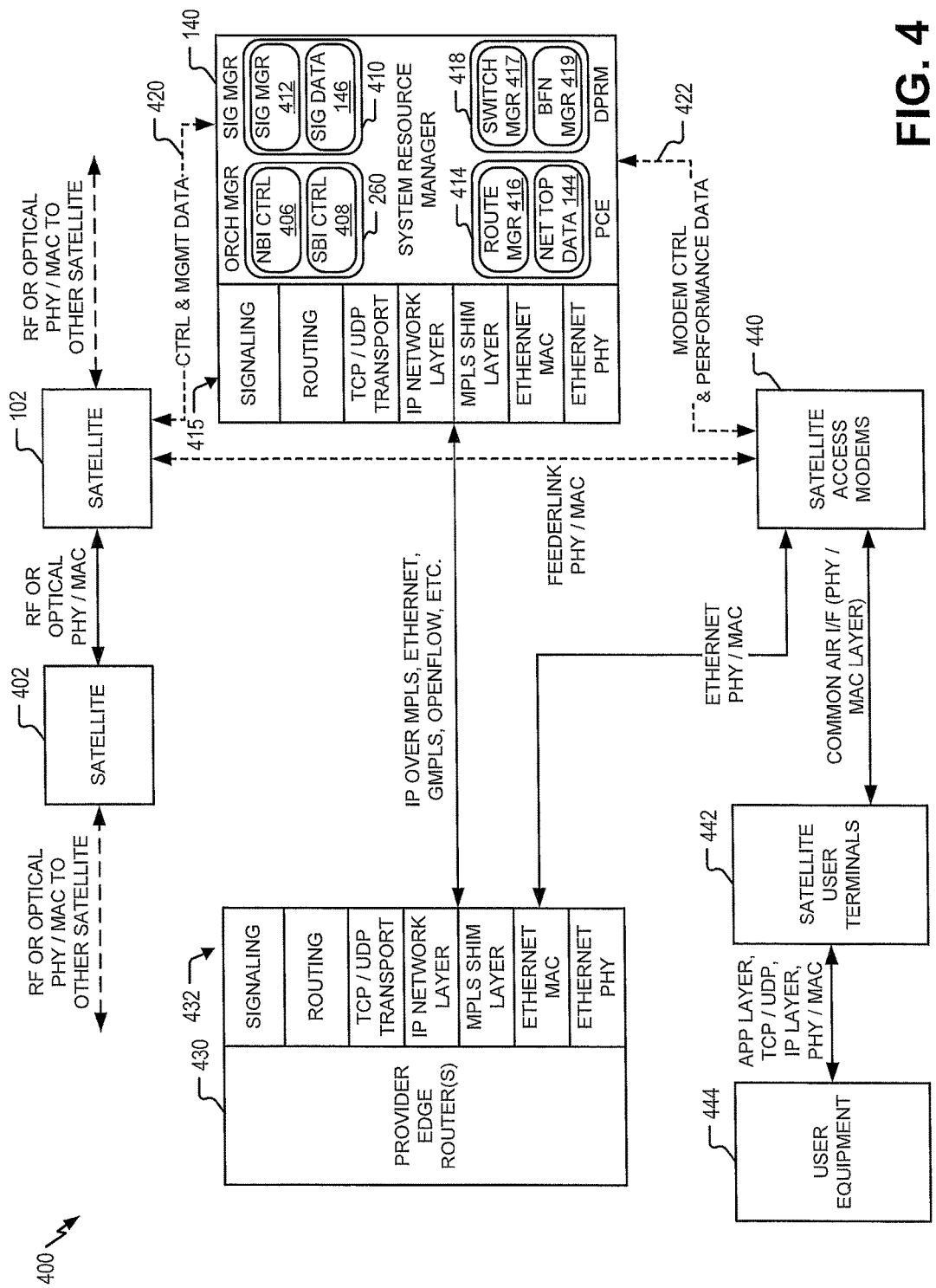
FIG. 4 is a block diagram that illustrates a particular implementation of a satellite-based communications network with a configurable switch matrix on-board the satellite.

FIG. 4 depicts an illustrative example of a satellite-based communications network 400 having a configurable switch matrix on-board the satellite. In a particular implementation described with reference to FIG. 4, the satellite-based communications network 400 includes the satellite 102 of FIG. 1. Although described with reference to FIG. 4 as a satellite-based networks, in other implementations, other vehicle-based communications networks perform the operations described herein. For example, the other vehicle-based communications networks may include the vehicle 201 of FIG. 2 or the vehicle 201 of FIG. 3.

The satellite-based communications network 400 includes the satellite 102, a second satellite 402, the resource manager 140, one or more provider edge routers 430, satellite access modems 440, satellite user terminals 442, and user equipment 444 (e.g., subscriber devices). The one or more provider edge routers 430 include routers configured to communicate with customer edge routers of different networks, such as the provider edge routers 212, 222, 232, and 242 of FIGS. 2 and 3. The satellite access modems 440 are integrated in one or more resource gateways and configured to send data traffic to the satellite 102 as an uplink beam and to receive data traffic from the satellite 102 as a downlink beam. The satellite user terminals 442 are configured to send data to and receive data from the satellite access modems 440 in order to support one or more service supported by the satellite-based communications network 400. The user equipment 444 include subscriber devices configured to send and receive data from the satellite user terminals 442 to access the one or more services. For example, the user equipment 444 includes mobile devices, such as mobile phones, tablet computers, laptop computers, smart watches, media playback devices, navigation systems, personal digital assistants (PDAs), satellite phones, vehicles (or components thereof), or a combination thereof, as non-limiting examples, or stationary computerized devices.

In the particular implementation illustrated in FIG. 4, the resource manager 140 includes the orchestration manager 260 ("ORCH MGR"), a signaling manager 410 ("SIG MGR"), a path computation element 414 ("PCE"), and a digital payload resource manager 418 ("DPRM"). Although various functions are described herein with respect to the components 260, 410, 414, and 418, such description is for illustration only. In other implementations, one or more of the components 260, 410, 414, and 418 may be integrated in a single component that performs functions associated with multiple components. Each of the components 260, 410, 414, and 418 may be implemented using hardware (e.g., a FPGA, an ASIC, a DSP, a controller, other dedicated circuitry, etc.), software (e.g., instructions executable by a processor), or a combination thereof. In a particular implementation, the resource manager 140 is integrated in a ground-based component, such as a ground-based operations center, as described with reference to FIG. 2, or is distributed amongst multiple ground-based components, such as resource gateways and the ground-based operations center. In an alternate implementation, the resource manager 140 is integrated in the satellite 102, as described with reference to FIGS. 1 and 3.

The orchestration manager 260 is configured to generate orchestration data (e.g., the orchestration data 262 of FIGS. 2 and 3) based on data from an operator at a ground-based operations center or based on data generated at the satellite 102 (e.g., sensor data), as described with reference to FIGS. 2 and 3. In a particular implementation, the orchestration includes a northbound interface controller 406 ("NBI CTRL") and a southbound interface controller 408 ("SBI CTRL"). The northbound interface controller 406 is configured to communicate with components having higher priority with respect to operation of the satellite 102, such as flight path/orbit management systems, power systems, and other real-time systems. The southbound interface controller 408 is configured to communicate with components having a lower priority with respect to operation of the satellite 102, such as the signal manager 410, the path computation element 414, and the digital payload resource manager 418. To illustrate, the orchestration manager 260 may be configured to receive data from the northbound interface controller 406 from other systems of the satellite 102, to generate the orchestration data based on the data received via the northbound interface controller 406, and to provide the orchestration data to the signal manager 410, the path computation element 414, and the digital payload resource manager 418 via the southbound interface controller 408.

The path computation element 414 is configured to maintain the network topology data 144 and to determine one or more routes through the various networks described by the network topology data 144. The path computation element 414 may include a route manager 416 ("ROUTE MGR") and storage to maintain and store the network topology data 144 ("NET TOP DATA"). In a particular implementation, the path computation element 414 maintains a traffic engineering database that includes the network topology data 144 in addition to traffic configuration data and parameters associated with links and components of the various networks. The route manager 416 is configured to perform route computation based on the network topology data 144 to determine one or more communications paths. For example, the route manager 416 may be configured to perform path computation operations, topology discovery operations, topology distribution operations, or a combination thereof.

The signaling manager 410 is configured to maintain the signaling data 146 and to determine signaling associated with links through the various networks described by the signaling data 146. The signaling manager 410 may include a signaling manager component 412 ("SIG MGR") and storage to maintain and store the signaling data 146 ("SIG DATA"). In a particular implementation, the signaling manager component 412 maintains a label information base that includes the signaling data 146. The signaling manager component 412 is configured to determine signaling associated with one or more links along one or more communications paths. For example, the signaling manager component 412 may be configured to perform signaling protocol processing, intra-AS signaling management (e.g., management of signaling associated with links within the satellite-based communications network 400), inter-AS signaling management (e.g., management of signaling associated with links to external networks or to portions of the satellite-based communications network 400 controlled by tier-2 operators, such as MVNOs or VNOs), and path error management operations.

The digital payload resource manager 418 is configured to receive requests from the path computation element 414 and the signaling manager 410 associated with initializing or modifying one or more communications paths and signaling associated with links of the one or more communications paths. The digital payload resource manager 418 is further configured to translate the requests into cross-connects within the satellite 102 (e.g., cross-connects from the channelizer 108 to the combiner 112 via the switch matrix 110) by generating configuration data for use by components of the payload 104 (of the satellite 102) based on the requests. In a particular implementation, the digital payload resource manager 418 includes a switch management component 417 ("SWITCH MGR") and a beamforming management component 419 ("BFN MGR"). The switch management component 417 is configured to generate switching configuration data (e.g., the switching configuration data 142 of FIGS. 1-3) based on the requests (which are based on the network topology data 144 and the signaling data 146), as described with reference to FIG. 1. The beamforming management component 419 is configured to generate beamforming configuration data (e.g., the beamforming configuration data 252 of FIGS. 2 and 3) based on the requests (which are based on the network topology data 144 and the signaling data 146), as described with reference to FIGS. 2 and 3. Additionally, if orchestration data is received from the orchestration manager 260, the switch management component 417 and the beamforming management component 419 are configured to use the orchestration data in generating the respective configuration data.

During operation, the satellite-based communications network 400 enables routing of data amongst components and to different locations via the satellite 102 (and other satellites). To illustrate, the user equipment 444 sand the satellite user terminals 442 share data and signaling at one or more of an ethernet physical (PHY) layer, an ethernet media access control (MAC) layer, an IP network layer, a TCP layer, a UDP layer, and an application layer. The satellite user terminals 442 and the satellite access modems 440 share data and signaling via a common air interface at the PHY and MAC layers. Additionally, the satellite access modems 440 receive data and signaling from the provider edge routers 430 via ethernet PHY and MAC layers. The satellite access modems 440 combine the received data to generate one or more uplink beams that are sent to the satellite 102 as well as any control information that is sent to the satellite 102 via a feederlink (at the PHY and MAC layer). Additionally, the satellite access modems 440 send modem control and performance data 422 to the resource manager 140.

The provider edge routers 430 receive data from external networks and route the data to the satellite access modems 440 for transmission to the satellite 102. The provider edge routers 430 may perform communications in accordance with a protocol stack 432 that includes an ethernet PHY layer, an ethernet MAC layer, a multiprotocol label-switched (MPLS) shim layer, an IP network layer, a TCP/UDP transport layer, a routing layer, and a signaling layer. The provider edge routers 430 also send network topology data (e.g., routing data) and signaling data received from the external networks to the resource manager. For example, the network topology data and the signaling data are communicated to the resource manager 140, which performs communications in accordance with a protocol stack 415 that includes an ethernet PHY layer, an ethernet MAC layer, a MPLS shim layer, an IP network layer, a TCP/UDP transport layer, a routing layer, and a signaling layer. In a particular implementation, the network topology data and the signaling data are communicated in accordance with a GMPLS protocol suite or an OPENFLOW protocol suite. In other implementations, other protocols are used, such as a RSVP-TE protocol, an OSPF-TE protocol, an IP over MPLS protocol, an ethernet protocol, or other networking protocols, are used to communicate the network topology data and the signaling data to the resource manager 140.

The resource manager 140 generates and maintains the network topology data 144 and the signaling data 146 based on the network topology data and signaling data received from the provider edge routers 430 and based on the modem control and performance data 422 received from the satellite access modems 440. The resource manager 140 (e.g., the switch management component 417 and the beamforming management component 419) generates switching configuration data and beamforming configuration data, and the resource manager 140 sends the switching configuration data, the beamforming configuration data, and other configuration and control data to the satellite 102 as control and management data 420. The satellite 102 receives the control and management data 420 and configures one or more components (e.g., the AFE 106, the channelizer 108, the switch matrix 110, the combiner 112, the ABE 114, the receive antennas, the transmit antennas, or a combination thereof) of the payload 104 based on the control and management data 420. Configuring the one or more components causes the satellite 102 to propagate data traffic received in the one or more uplink beams from one or more input ports, via the one or more components, to one or more output ports using communications paths that are determined based on the network topology data 144 and the signaling data 146. The satellite 102 generates RF signals (e.g., one or more downlink beams) at the transmit antennas for transmission to another location on the ground, to the second satellite 402 (via a RF or optical PHY and MAC layer communication), or to one or more other satellites via RF or optical PHY and MAC layer communications.

By receiving network topology and signaling data from the provider edge routers 430 and generating the control and management data 420 based on the received network topology data and the received signaling data, the resource manager 140 is able to "translate" communications path requests from the label-switched (or other IP-switched) domain of one or more other networks to the domain of the satellite 102 (e.g., the switch matrix 110). In this manner, the satellite 102 is able to perform label-switching functionality, thereby causing the satellite-based communications network 400 to appear as a label-switched network to external networks. As explained above, this functionality allows the vehicle-based network to interact with other networks according to a full-peering model, which enables the networks to meet various criteria, such as QoS criteria, that are not able to be met by other satellite-based networks that operate as a circuit-switched overlay to external networks.

Although particular protocol layers are illustrated and described with reference to FIG. 4, such description is not limiting. In other implementations, the communications described herein can be performed at different protocol layers than illustrated in FIG. 4.

Figure 5:
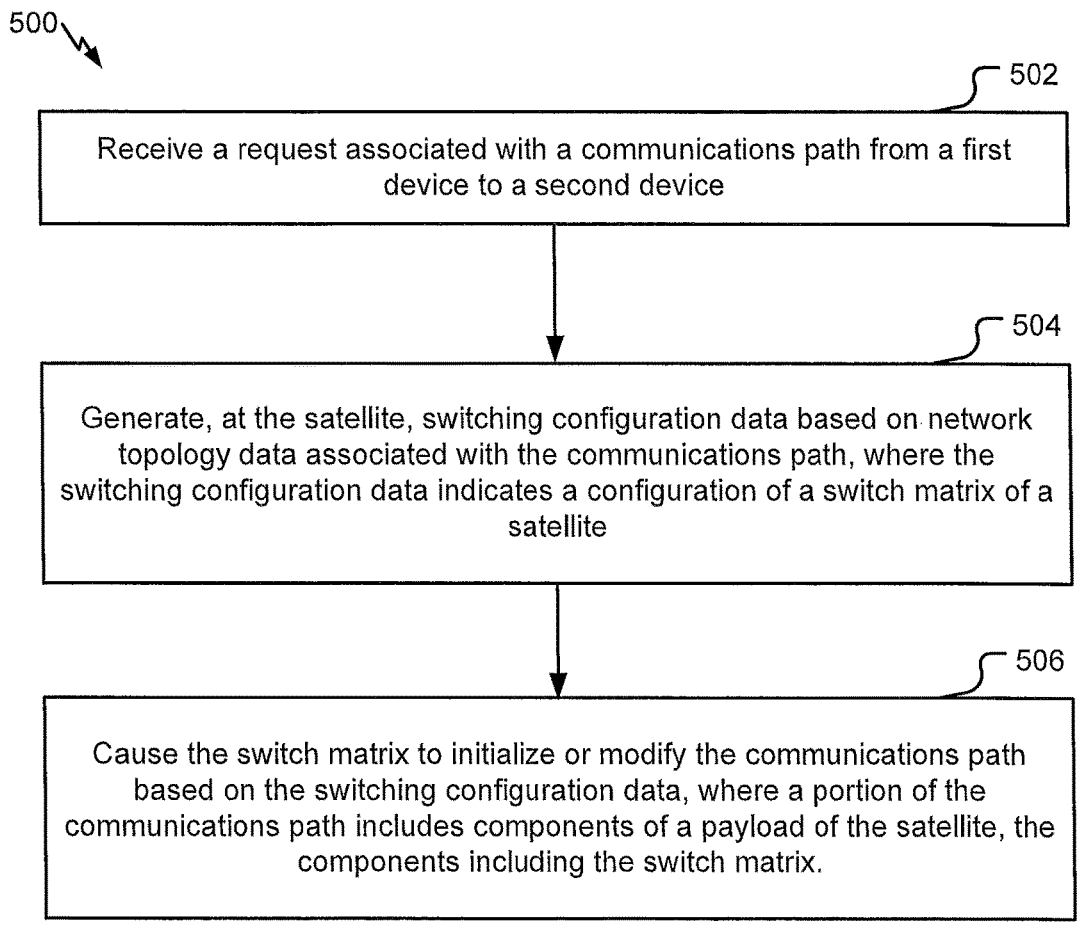
FIG. 5 is a flow chart of an example of a method of configuring a switch matrix of a satellite based on network control plane information or user plane traffic patterns.

FIG. 5 illustrates a method 500 of configuring a switch matrix of a satellite based on network information (e.g., network topology data, signaling data, or both). In a particular implementation, the method 500 is performed by the resource manager 140 of FIGS. 1-4, as a non-limiting example.

The method 500 includes receiving a request associated with a communications path from a first device to a second device, at 502. For example, the request 148 indicates a communications path between two devices, as described with reference to FIG. 1.

The method 500 includes generating switching configuration data based on network topology data associated with the communications path, at 504. The switching configuration data indicates a configuration of a switch matrix of a satellite. For example, the switching configuration data 142 is generated based on the network topology data 144 and the request 148, as described with reference to FIG. 1. The switching configuration data 142 indicates a configuration of the switch matrix 110, such as states of one or more switches of the switch matrix 110, a permutation table indicating configurations of the one or more switches, one or more filter components, or other configuration data, as described with reference to FIG. 1. In a particular implementation, the request 148 is received at the satellite 102 and the switching configuration data 142 is generated on-board the satellite 102, as described with reference to FIG. 1. In an alternate implementation, the request 148 is received at, and the switching configuration data 142 is generated at, a ground-based component of a communications network, such as the ground-based operations center 250 or a gateway, as described with reference to FIG. 2.

The method 500 further includes causing the switch matrix to initialize or modify the communications path based on the switching configuration data, at 506. A portion of the communications path includes components of a payload of the satellite, and the components include the switch matrix. For example, the switching manager 116 configures the switching matrix 110 based on the switching configuration data 142, as described with reference to FIG. 1 or FIG. 2.

In a particular implementation, the method 500 includes generating additional configuration data based on the network topology data and causing one or more other components of the payload to be configured based on the additional configuration data. For example, one or more of the AFE 106, the channelizer 108, the combiner 112, the ABE 114, or a combination thereof, are configured based on the additional configuration data 254. The additional configuration data 254 may be generated on-board a satellite (or other vehicle) or at a ground-based network component, as described with reference to FIGS. 1-3.

In another particular implementation, the method 500 includes receiving signaling data from a network device. The signaling data includes information associated with one or more label-switched paths (LSPs) through one or more external networks. For example, the resource manager 140 receives the signaling data 146 that indicates one or more LSPs through the networks 216, 226, 236, and 246. In a particular implementation, the network topology data 144 and the signaling data 146 are received in accordance with a GMPLS protocol suite or an OPENFLOW protocol suite. The signaling data 146 may be received on-board a satellite (or other vehicle) or at a ground-based network component, as described with reference to FIGS. 1-3.

In another particular implementation, the method 500 includes receiving one or more traffic engineering parameters from a network device. The switching configuration data is further based on the one or more traffic engineering parameters. To illustrate, the one or more traffic engineering parameters 256 may be received and used to determine the switching configuration data 142, as described with reference to FIG. 3, or at the vehicle (e.g., a satellite), as described with reference to FIG. 2. The one or more traffic engineering parameters include a QoS parameter, a network-specific policy parameter, other parameters, or a combination thereof.

In another particular implementation, the method 500 includes generating beamforming configuration data based on the network topology data and the communications path. In this implementation, the method 500 further includes configuring receive circuitry of the payload, transmit circuitry of the payload, or both, based on the beamforming configuration data. For example, the resource manager 140 generates the beamforming configuration data 252 and the beamforming manager 202 configures one or more receive antennas, the AFE 106, the ABE 114, one or more transmit antennas, other receive or transmit circuitry, or a combination thereof, based on the beamforming configuration data 252, as described with reference to FIGS. 2 and 3.

In another particular implementation, the method 500 includes receiving orchestration data. In this implementation, the switching configuration data is generated further based on the orchestration data. To illustrate, the orchestration manager 260 generates the orchestration data 262 that indicates one or more orchestrated events including a handover from the vehicle 201 to a second vehicle, a planned outage associated with the vehicle 201, an unplanned outage associated with the vehicle 201, a change in orbit of the vehicle 201, a change in system capacity demand associated with the vehicle 201, a change in user attachment point related to the vehicle 201, or a combination thereof. The resource manager 140 generates the switching configuration data 142 based on the orchestration data 262, as further described with reference to FIGS. 2 and 3.

The method 500 enables a satellite to perform the operations of a label-switched router even though the satellite does not demodulate communications data to extract labels (or other headers). For example, by configuring the switch matrix based on the network topology data and the request for the communications path, a satellite is able to perform label-switched routing functionality. Because the satellite performs label-switched routing functionality, a satellite-based network is able to be controlled using control plane data associated with other label-switched (or other IP-switched) networks, which may enable the networks to be operated as a single network (e.g., according to a full-peering model) instead of operating the satellite-based network as an overlay between other networks. Operating the networks according to the full-peering model enables various end-to-end criteria, including QoS criteria to be met and allows network-specific policies to be enforced throughout multiple networks, as compared to other satellite-based networks (or other vehicle-based networks) that operate as a circuit-switched overlay and are not able to meet end-to-end criteria.

In a particular implementation, one or more of the elements of the method 500 of FIG. 5 may be performed by a processor that executes instructions stored on a non-transitory, computer readable medium. For example, a non-transitory computer readable medium stores instructions that, when executed by a processor, cause the processor to perform operations including processing, at a satellite, a request associated with a communications path from a first device to a second device. A portion of the communications path includes components of a payload of the satellite, the components including a switch matrix. The operations include generating, at the satellite, switching configuration data based on network topology data associated with the communications path. The switching configuration data indicates a configuration of a switch matrix of the payload. The operations further include configuring the switch matrix to initialize or modify the communications path based on the switching configuration data.

Although one or more of FIGS. 1-5 may illustrate systems, apparatuses, and/or methods according to the teachings of the disclosure, the disclosure is not limited to these illustrated systems, apparatuses, and/or methods. One or more functions or components of any of FIGS. 1-5 as illustrated or described herein may be combined with one or more other portions of another of FIGS. 1-5. For example, one or more elements of the method 500 of FIG. 5 may be performed in combination with other operations described herein. Accordingly, no single implementation described herein should be construed as limiting and implementations of the disclosure may be suitably combined without departing form the teachings of the disclosure. As an example, one or more operations described with reference to FIG. 5 may be optional, may be performed at least partially concurrently, and/or may be performed in a different order than shown or described.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
receiving a request associated with communication between a first device and a second device;
responsive to the request, generating switching configuration data based on mapping a label-switched network path between the first device and the second device to one or more communication frequency slices; and
causing a switch matrix of a satellite to be configured based on the switching configuration data to enable the satellite to route a data packet with an encapsulated routing label between the first device and the second device without demodulating the data packet.

2. The method of claim 1, wherein the switching configuration data is generated on-board the satellite, wherein the switch matrix includes a plurality of switches configured to couple one or more input ports of the satellite to one or more output ports of the satellite, and wherein the switching configuration data indicates states of one or more switches of the plurality of switches.

3. The method of claim 1, wherein the switching configuration data indicates at least one of one or more filter configurations or one or more permutation tables associated with routing the one or more communication frequency slices associated with a radio frequency (RF) signal received at an input port of the satellite to one or more output ports of the satellite.

4. The method of claim 1, wherein the request comprises at least one of a request to establish a communications path between the first and second devices, a request to modify the communications path, or a request to terminate the communications path, and wherein the switching configuration data is further generated based on user plane traffic patterns.

5. The method of claim 1, wherein the first device comprises a first ground-based device that is communicatively coupled to a first network associated with a first provider, wherein the second device comprises a second ground-based device that is communicatively coupled to a second network associated with a second provider, and wherein the configuration of the switch matrix is associated with generation of a first output beam at a first transmit antenna of the satellite.

6. The method of claim 5, wherein the first provider comprises a first virtual network operator associated with a first virtual routing and forwarding (VRF) instance, wherein the second provider comprises a second virtual network operator associated with a second VRF instance that is different than the first VRF instance, and wherein the switching configuration data enables partial peering between the first network and a satellite-based network that includes the satellite.

7. The method of claim 5, wherein the switching configuration data enables full peering between the first network and a satellite-based network that includes the satellite, and wherein the switching configuration data enables full peering between the second network and the satellite-based network.

8. The method of claim 1, further comprising:
generating additional configuration data based on network topology data; and
causing one or more other components of a payload of the satellite to be configured based on the additional configuration data, wherein the one or more other components include at least one of a channelizer, a combiner, or a regenerator.

9. The method of claim 8, wherein the network topology data indicates connections between a plurality of network devices associated with one or more external networks.

10. The method of claim 1, further comprising receiving signaling data from a network device, wherein the signaling data includes information associated with one or more label-switched network paths through one or more external networks, and wherein the switching configuration data is generated based on the signaling data.

11. The method of claim 10, wherein network topology data is received in accordance with a constraint-based routing protocol, and wherein the signaling data is received in accordance with a signaling protocol.

12. A non-transitory computer readable medium storing instructions that, when executed by a processor, cause the processor to perform operations comprising:
processing, at a satellite, a request associated with a communications path between a first device and a second device, wherein a portion of the communications path includes components of a payload of the satellite, the components including a switch matrix;
responsive to the request, generating, at the satellite, switching configuration data based on mapping a label-switched network path between the first device and the second device to one or more communication frequency slices; and
configuring the switch matrix based on the switching configuration data to enable the satellite to route a data packet with an encapsulated routing label between the first device and the second device without demodulating the data packet.

13. The non-transitory computer readable medium of claim 12, wherein the operations further comprise receiving one or more traffic engineering parameters from a network device, wherein the switching configuration data is further based on the one or more traffic engineering parameters, and wherein the one or more traffic engineering parameters include at least one of a quality of service (QoS) parameter or a network-specific policy parameter.

14. The non-transitory computer readable medium of claim 12, wherein the operations further comprise:
generating, at the satellite, beamforming configuration data based on network topology data and the communications path; and
configuring receive circuitry of the payload, transmit circuitry of the payload, or both, based on the beamforming configuration data, wherein the beamforming configuration data indicates one or more beamforming weights based on at least one of one or more phase values or one or more amplitude values.

15. The non-transitory computer readable medium of claim 12, wherein the operations further comprise receiving orchestration data at the satellite, wherein the orchestration data indicates one or more orchestrated events associated with operation of the satellite, and wherein the switching configuration data is further based on the orchestration data.

16. The non-transitory computer readable medium of claim 15, wherein the orchestration data indicates at least one of a handover from the satellite to a second satellite, a planned outage associated with the satellite, an unplanned outage associated with the satellite, a change in orbit of the satellite, a change in system capacity demand associated with the satellite, or a change in user attachment point related to the satellite.

17. A system comprising:
a vehicle including:
- a switch matrix including a plurality of switches coupled between one or more receive antennas of the vehicle and one or more transmit antennas of the vehicle; and
- circuitry configured to initialize or modify a configuration of the switch matrix based on switching configuration data to enable routing of a data packet with an encapsulated routing label without demodulating the data packet; and a ground-based device of a communications network, the ground-based device configured to generate the switching configuration data based on mapping a label-switched network path between a first device and a second device to one or more communication frequency slices.

18. The system of claim 17, wherein the vehicle comprises a satellite or an aerial vehicle.

19. The system of claim 17, wherein the ground-based device is integrated in a ground-based operations center or includes a gateway, and wherein the ground-based device is communicatively coupled to the vehicle via a satellite communications link.

20. The system of claim 17, wherein the vehicle further comprises a management interface configured to provide network data associated with components of the vehicle via a wireless communications link to the ground-based device, to a second ground-based network device, or to both, and wherein the switching configuration data is further based on control information received via the wireless communications link from at least one of the ground-based device or the second ground-based network device.

* * * * *